US010882604B2

(12) United States Patent
Huynh

(10) Patent No.: US 10,882,604 B2
(45) Date of Patent: Jan. 5, 2021

(54) DISTRIBUTED TRAILING EDGE WING FLAP SYSTEMS

(71) Applicant: The Boeing Company, Chicago, IL (US)

(72) Inventor: Neal V. Huynh, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 506 days.

(21) Appl. No.: 15/874,545

(22) Filed: Jan. 18, 2018

(65) Prior Publication Data

US 2019/0217944 A1 Jul. 18, 2019

(51) Int. Cl.

| | |
|---|---|
| ***B64C 13/42*** | (2006.01) |
| ***B64C 13/50*** | (2006.01) |
| ***B64C 13/16*** | (2006.01) |
| ***B64C 9/20*** | (2006.01) |
| ***F15B 20/00*** | (2006.01) |
| ***B64C 9/18*** | (2006.01) |

(52) U.S. Cl.

CPC ................ *B64C 13/42* (2013.01); *B64C 9/18* (2013.01); *B64C 9/20* (2013.01); *B64C 13/16* (2013.01); *B64C 13/503* (2013.01); *B64C 13/504* (2018.01); *F15B 20/004* (2013.01)

(58) Field of Classification Search

CPC ....... B64C 13/40; B64C 13/505; B64C 13/42; B64C 13/50; B64C 13/503; B64C 9/16

See application file for complete search history.

(56) References Cited

U.S. PATENT DOCUMENTS 6,799,739 B1 10/2004 Jones
7,048,234 B2 * 5/2006 Recksiek ........... B64D 45/0005 244/213

(Continued)

FOREIGN PATENT DOCUMENTS

EP 1721825 11/2006
EP 1721826 11/2006

(Continued)

OTHER PUBLICATIONS

European Patent Office, "Extended European Search Report," issued in connection with European Patent Application No. 19193891.9, dated Feb. 12, 2020, 11 pages.

(Continued)

*Primary Examiner* — Justin M Benedik
(74) *Attorney, Agent, or Firm* — Hanley, Flight & Zimmerman, LLC

(57) ABSTRACT

Distributed trailing edge wing flap systems are described. An example wing flap system for an aircraft includes a flap and an actuator. The flap is movable between a deployed position and a retracted position relative to a fixed trailing edge of a wing of the aircraft. The actuator is to move the flap relative to the fixed trailing edge. The actuator is hydraulically drivable via first pressurized hydraulic fluid to be supplied by a hydraulic system of the aircraft. The actuator is also hydraulically drivable via second pressurized hydraulic fluid to be supplied by a local power unit. The local power unit is selectively connectable to an electrical system of the aircraft. The electrical system is to power the local power unit to supply the second pressurized hydraulic fluid.

20 Claims, 14 Drawing Sheets

(56) References Cited

U.S. PATENT DOCUMENTS

| | | | | |
|---|---|---|---|---|
| 8,434,301 | B2 | 5/2013 | Fukui | |
| 10,538,310 | B2 | 1/2020 | Polcuch | |
| 2004/0075020 | A1* | 4/2004 | Trikha | B64C 13/505 244/99.4 |
| 2006/0043242 | A1 | 3/2006 | Benson | |
| 2006/0144996 | A1 | 7/2006 | Carl et al. | |
| 2010/0089053 | A1 | 4/2010 | Hanlon et al. | |
| 2010/0288886 | A1* | 11/2010 | Schievelbusch | B64D 45/0005 244/194 |
| 2011/0062282 | A1* | 3/2011 | Richter | B64D 45/0005 244/99.4 |
| 2014/0175216 | A1 | 6/2014 | Ishihara | |
| 2015/0090843 | A1 | 4/2015 | Guering | |
| 2016/0009375 | A1 | 1/2016 | Young et al. | |
| 2018/0156293 | A1 | 6/2018 | Fox et al. | |
| 2018/0178902 | A1 | 6/2018 | Nfonguem et al. | |
| 2019/0291850 | A1 | 9/2019 | Huynh | |
| 2019/0308719 | A1 | 10/2019 | Huynh | |
| 2020/0070959 | A1 | 3/2020 | Huynh | |
| 2020/0079497 | A1 | 3/2020 | Huynh | |

FOREIGN PATENT DOCUMENTS

| | | |
|---|---|---|
| EP | 2202146 | 6/2010 |
| EP | 2524865 | 11/2012 |
| EP | 2955104 | 12/2015 |
| EP | 3121116 | 1/2017 |
| EP | 3549857 | 10/2019 |

OTHER PUBLICATIONS

European Patent Office, "Extended European Search Report," issued in connection with European Patent Application No. 19166351.7, dated Aug. 5, 2019, 6 pages.

United States Patent and Trademark Office, "Non-Final Office Action," issued in connection with U.S. Appl. No. 15/947,595, dated Aug. 6, 2020, 5 pages.

United States Patent and Trademark Office, "Non-Final Office Action," issued in connection with U.S. Appl. No. 16/126,671, dated Aug. 6, 2020, 7 pages.

United States Patent and Trademark Office, "Requirement for Restriction," issued in connection with U.S. Appl. No. 15/926,477, dated Jul. 20, 2020, 6 pages.

United States Patent and Trademark Office, "Non-Final Office Action," issued in connection with U.S. Appl. No. 16/122,519, dated Aug. 6, 2020, 6 pages.

United States Patent and Trademark Office, "Notice of Allowance" issued in connection with U.S. Appl. No. 15/926,477, dated Nov. 9, 2020, 8 pages.

* cited by examiner

DISTRIBUTED TRAILING EDGE WING FLAP SYSTEMS

FIELD OF THE DISCLOSURE

This disclosure relates generally to aircraft wing flaps and, more specifically, to distributed trailing edge wing flap systems.

BACKGROUND

Aircraft wings (e.g., the wings of a commercial aircraft) commonly include flaps (e.g., outboard flaps and/or inboard flaps) located at and/or along the respective fixed trailing edge of each aircraft wing. The flaps are movable relative to the fixed trailing edges of the aircraft wings between retracted and deployed positions. Deploying the flaps from the aircraft wings during flight (e.g., during landing) typically increases a lift characteristic associated with the aircraft wings, while retracting the flaps during flight (e.g., during cruise) typically reduces the lift characteristic.

SUMMARY

Distributed trailing edge wing flap systems are disclosed herein. In some examples, a wing flap system for an aircraft is disclosed. In some disclosed examples, the wing flap system comprises a flap and an actuator. In some disclosed examples, the flap is movable between a deployed position and a retracted position relative to a fixed trailing edge of a wing of the aircraft. In some disclosed examples, the actuator is to move the flap relative to the fixed trailing edge. In some disclosed examples, the actuator is hydraulically drivable via first pressurized hydraulic fluid to be supplied by a hydraulic system of the aircraft. In some disclosed examples, the actuator is also hydraulically drivable via second pressurized hydraulic fluid to be supplied by a local power unit. In some disclosed examples, the local power unit is selectively connectable to an electrical system of the aircraft. In some disclosed examples, the electrical system is to power the local power unit to supply the second pressurized hydraulic fluid.

In some examples, a wing flap system for an aircraft is disclosed. In some disclosed examples, the wing flap system comprises first, second, third and fourth flaps movable between respective deployed positions and respective retracted positions. In some disclosed examples, the first and second flaps are movable relative to a first fixed trailing edge of a first wing of the aircraft. In some disclosed examples, the third and fourth flaps are movable relative to a second fixed trailing edge of a second wing of the aircraft. In some disclosed examples, the wing flap system further comprises first, second, third, fourth, fifth, sixth, seventh and eighth actuators. In some disclosed examples, the first and second actuators are to move the first flap relative to the first fixed trailing edge. In some disclosed examples, the third and fourth actuators are to move the second flap relative to the first fixed trailing edge. In some disclosed examples, the fifth and sixth actuators are to move the third flap relative to the second fixed trailing edge. In some disclosed examples, the seventh and eighth actuators are to move the fourth flap relative to the second fixed trailing edge. In some disclosed examples, respective ones of the first, second, fifth and sixth actuators are hydraulically drivable via first pressurized hydraulic fluid to be supplied by a first hydraulic system of the aircraft. In some disclosed examples, respective ones of the third, fourth, seventh and eighth actuators are hydraulically drivable via second pressurized hydraulic fluid to be supplied by a second hydraulic system of the aircraft. In some disclosed examples, the wing flap system further comprises first, second, third and fourth local power units. In some disclosed examples, the first actuator is independently hydraulically drivable via third pressurized hydraulic fluid to be supplied by the first local power unit. In some disclosed examples, the third actuator is independently hydraulically drivable via fourth pressurized hydraulic fluid to be supplied by the second local power unit. In some disclosed examples, the fifth actuator is independently hydraulically drivable via fifth pressurized hydraulic fluid to be supplied by the third local power unit. In some disclosed examples, the seventh actuator is independently hydraulically drivable via sixth pressurized hydraulic fluid to be supplied by the fourth local power unit.

Figure 1:
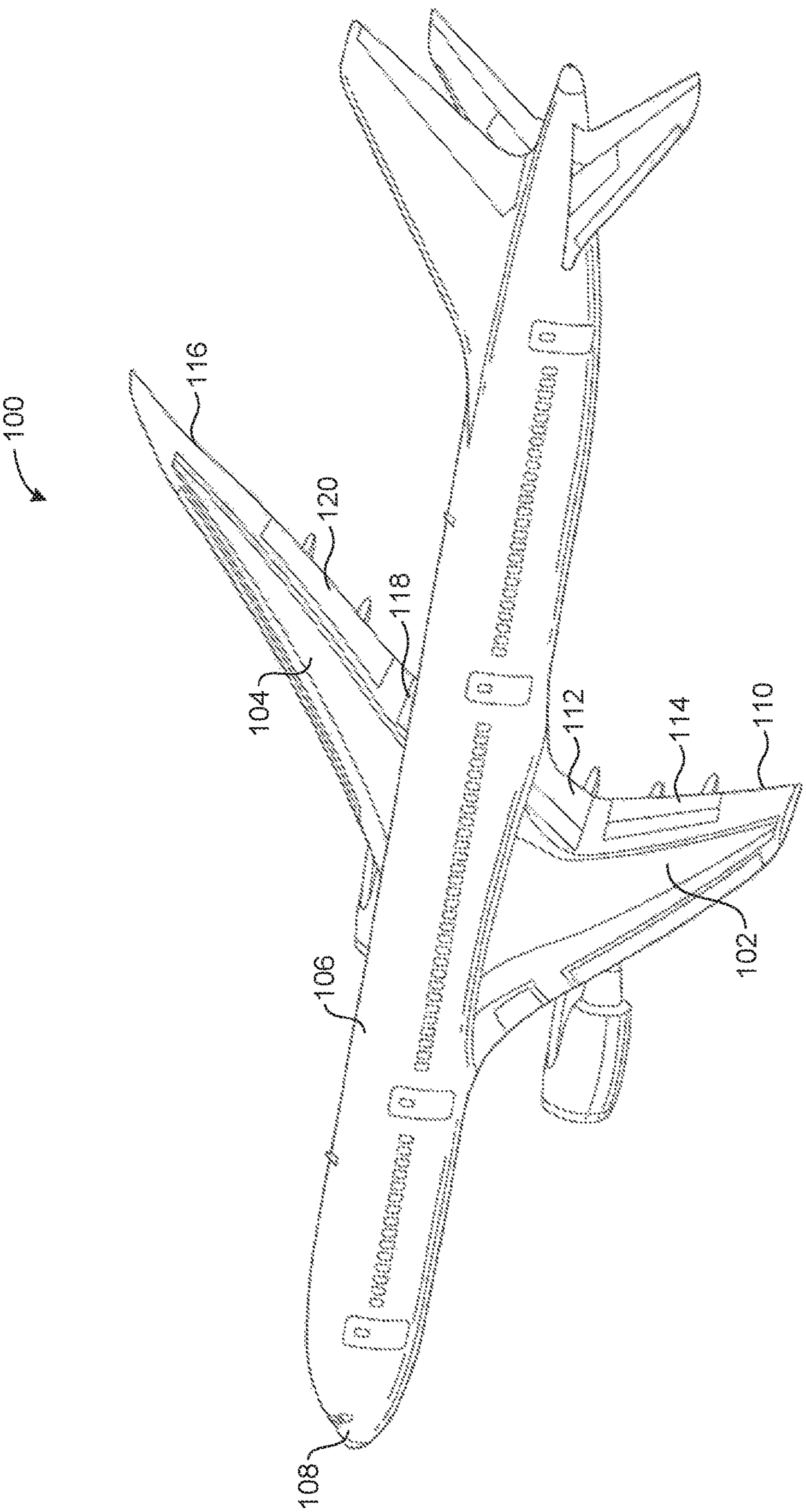
FIG. 1 illustrates an example aircraft in which an example distributed trailing edge wing flap system may be implemented in accordance with the teachings of this disclosure.

Certain examples are shown in the above-identified figures and described in detail below. In describing these examples, like or identical reference numbers are used to identify the same or similar elements. The figures are not necessarily to scale, and certain features and certain views of the figures may be shown exaggerated in scale or in schematic for clarity and/or conciseness.

DETAILED DESCRIPTION

Aircraft wings (e.g., the wings of a commercial aircraft) commonly include flaps (e.g., outboard flaps and/or inboard flaps) located at and/or along the respective fixed trailing edge of each aircraft wing. Conventional trailing edge wing flap systems may include actuators arranged to move the flaps relative to the fixed trailing edges of the aircraft wings between retracted and deployed positions. In such conventional trailing edge wing flap systems, the actuators are hydraulically driven and/or powered by multiple independent hydraulic systems of the aircraft. The actuators of such conventional trailing edge wing flap systems may be rendered inoperable in the event of a partial or complete failure of one or more of the hydraulic system(s), thereby leaving the aircraft without the ability to change and/or control the respective positions of the wing flaps (e.g., without the ability to maintain and/or to actuate a wing flap to the last commanded position of the wing flap).

In contrast to the conventional trailing edge wing flap systems described above, the example distributed trailing edge wing flap systems disclosed herein advantageously include at least one actuator (e.g., one actuator per wing flap) that may be hydraulically driven and/or powered by a hydraulic system of an aircraft, and may independently be hydraulically driven and/or powered by a local power unit (LPU) selectively connected to an electrical system of the aircraft. When connected to the electrical system of the aircraft, the LPU advantageously supplies pressurized hydraulic fluid to the actuator independent of any pressurized hydraulic fluid that may be supplied to the actuator via the hydraulic system of the aircraft. The LPU may accordingly restore and/or maintain the ability of the aircraft to change and/or control a position of a wing flap with which the LPU is associated (e.g., restore and/or maintain the ability to actuate a wing flap to the last commanded position of the wing flap).

In some disclosed examples, each wing flap of a distributed trailing edge wing flap system includes at least one actuator that may be hydraulically driven and/or powered by a hydraulic system of an aircraft, and may independently be hydraulically driven and/or powered by a LPU selectively connected to an electrical system of the aircraft. In such examples, the LPUs advantageously restore and/or maintain the ability of the aircraft to change and/or control the respective positions of the respective wing flaps with which corresponding respective ones of the LPUs are associated (e.g., restore and/or maintain the ability to actuate respective ones of the wing flaps to corresponding respective last commanded positions of the wing flaps). In such examples, the distributed trailing edge wing flap system advantageously implements respective ones of the LPUs to prevent and/or mediate the development of asymmetries among the respective positions of respective ones of the wing flaps.

In some examples, the disclosed distributed trailing edge wing flap systems may be implemented by and/or integrated into an aircraft having a fly-by-wire flight control system and a power architecture including two independent hydraulic systems and two independent electrical systems (e.g., a 2H2E power architecture). In some such examples, the electrical systems of the aircraft may be operable at low voltage power (e.g., 115 VAC or 28 VDC).

FIG. 1 illustrates an example aircraft 100 in which an example distributed trailing edge wing flap system may be implemented in accordance with the teachings of this disclosure. Example distributed trailing edge wing flap systems disclosed herein may be implemented in commercial aircraft (e.g., the aircraft 100 of FIG. 1) as well as other types of aircraft (e.g., military aircraft, unmanned aerial vehicles, etc.). The aircraft 100 of FIG. 1 includes an example first wing 102, an example second wing 104, an example fuselage 106, and an example cockpit area 108. The first wing 102 includes an example first fixed trailing edge 110, an example first inboard flap 112, and an example first outboard flap 114. The first inboard flap 112 and the first outboard flap 114 are respectively located at and/or along the first fixed trailing edge 110 of the first wing 102. The second wing 104 includes an example second fixed trailing edge 116, an example second inboard flap 118, and an example second outboard flap 120. The second inboard flap 118 and the second outboard flap 120 are respectively located at and/or along the second fixed trailing edge 116 of the second wing 104.

In the illustrated example of FIG. 1, the first inboard flap 112 and the first outboard flap 114 are shown in respective retracted positions relative to the first fixed trailing edge 110 of the first wing 102, and the second inboard flap 118 and the second outboard flap 120 are shown in respective retracted positions relative to the second fixed trailing edge 116 of the second wing 104. The first inboard flap 112 and the first outboard flap 114 are movable and/or actuatable between the respective retracted positions shown in FIG. 1 and respective deployed positions in which the first inboard flap 112 and the first outboard flap 114 are extended rearward and/or downward from the first fixed trailing edge 110 of the first wing 102. The second inboard flap 118 and the second outboard flap 120 are similarly movable and/or actuatable between the respective retracted positions shown in FIG. 1 and respective deployed positions in which the second inboard flap 118 and the second outboard flap 120 are extended rearward and/or downward from the second fixed trailing edge 116 of the second wing 104. In some examples, respective ones of the wing flaps (e.g., the first inboard flap 112, the first outboard flap 114, the second inboard flap 118, and/or the second outboard flap 120) may be movable and/or actuatable to a variety of deployed positions corresponding to desired and/or commanded detents of the flaps (e.g., flaps thirty (F30), flaps forty (F40), etc.).

Figure 2:
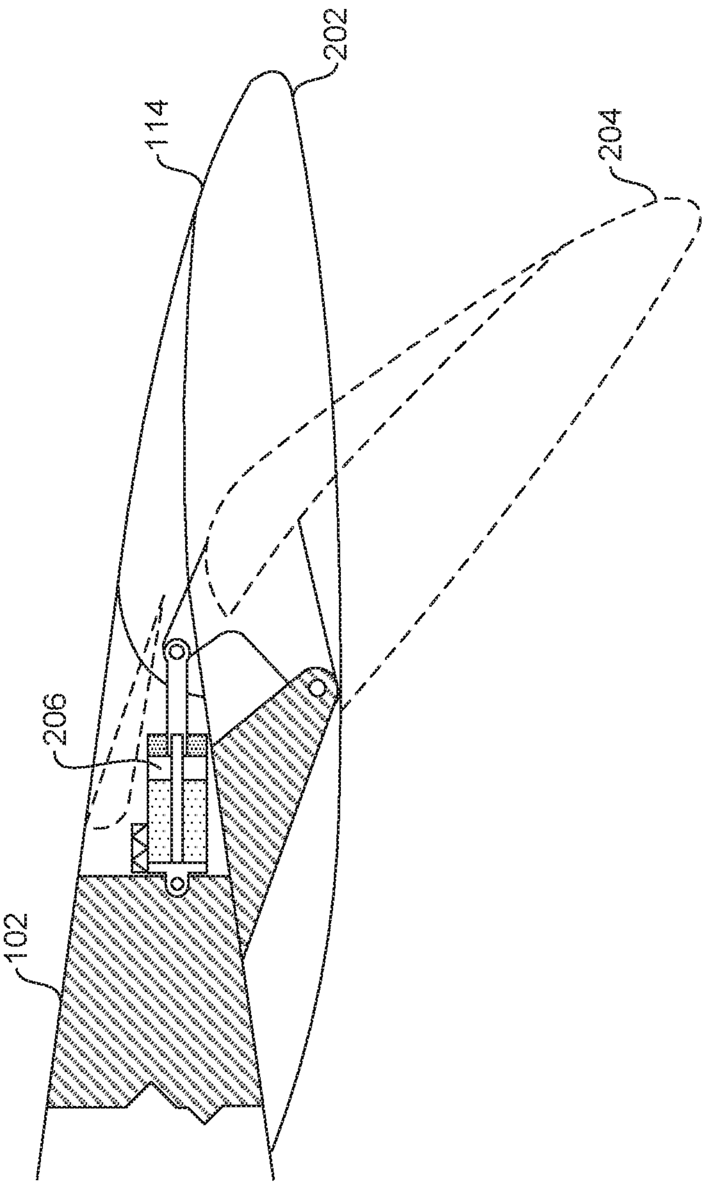
FIG. 2 is a cross-sectional view of the example first outboard flap of the example first wing of FIG. 1.

In some examples, respective ones of the wing flaps (e.g., the first inboard flap 112, the first outboard flap 114, the second inboard flap 118, and/or the second outboard flap 120) may be movable and/or actuatable between a retracted position and a deployed position via one or more actuator(s) (e.g., one or more hydraulic linear actuator(s), one or more hydraulic rotary actuator(s), etc.). FIG. 2 is a cross-sectional view of the example first outboard flap 114 of the example first wing 102 of FIG. 1. In the illustrated example of FIG. 2, the first outboard flap 114 is hinged at the first wing 102 and is movable and/or actuatable (e.g., rotatable) between an example retracted position 202 and an example deployed position 204 (shown in phantom) via an example actuator 206 coupled to the first outboard flap 114 and to the first wing 102. While only a single actuator is shown in the example of FIG. 2, additional (e.g., a second, a third, a fourth, etc.) actuators may also be coupled to the first outboard flap 114 and to the first wing 102 to control and/or facilitate movement of the first outboard flap 114 between the retracted position 202 and the deployed position 204.

In the illustrated example of FIGS. 1 and 2, each actuator (e.g., the actuator 206) may be powered, controlled, and/or operated via a corresponding hydraulic module operatively coupled to the actuator and located within a corresponding one of the wings (e.g., the first wing 102 or the second wing 104) of the aircraft 100. For example, the actuator 206 of FIG. 2 coupled to the first outboard flap 114 and to the first wing 102 may be powered, controlled, and/or operated via a hydraulic module operatively coupled to the actuator 206 and located within the first wing 102. Each hydraulic module may be powered, controlled, and/or operated via a corresponding remote electronics unit (REU) operatively coupled to the hydraulic module and located within a corresponding one of the wings (e.g., the first wing 102 or the second wing 104) of the aircraft 100. Each REU may be powered, controlled, and/or operated via one or more flight control electronics unit(s) (FCEU) operatively coupled to the REU and located within the fuselage 106 of the aircraft 100. The one or more FCEU(s) may be controlled and/or operated based on one or more input(s) received from a flap lever and/or a pilot control inceptor operatively coupled to the FCEU(s) and located in the cockpit area 108 of the aircraft 100.

Figure 3:
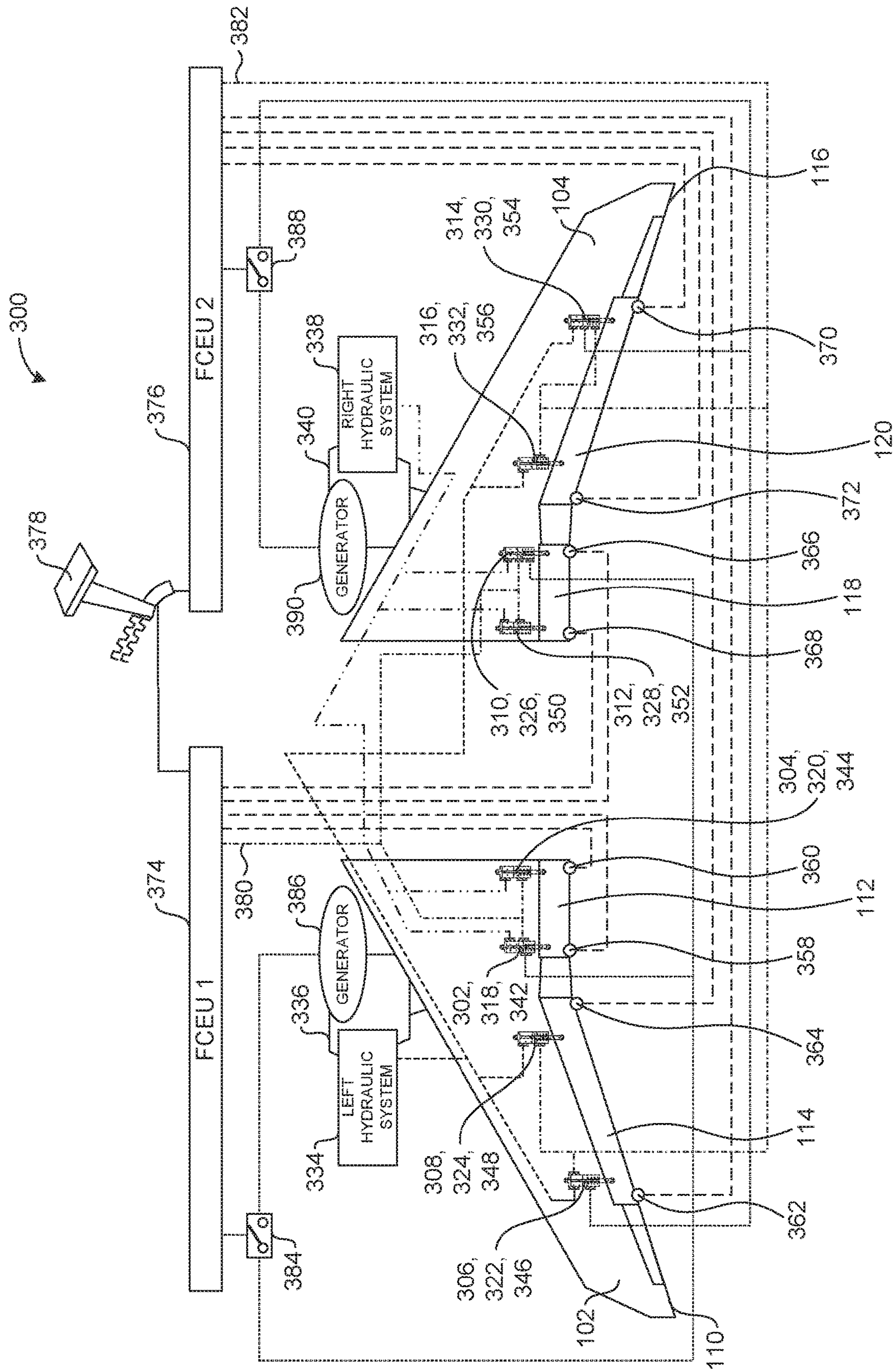
FIG. 3 is a schematic of an example distributed trailing edge wing flap system constructed in accordance with the teachings of this disclosure.

FIG. 3 is a schematic of an example distributed trailing edge wing flap system 300 constructed in accordance with the teachings of this disclosure. The distributed trailing edge wing flap system 300 of FIG. 3 may be implemented in the example aircraft 100 of FIG. 1 described above. In the illustrated example of FIG. 3, the distributed trailing edge wing flap system includes the first wing 102, the second wing 104, the first fixed trailing edge 110, the first inboard flap 112, the first outboard flap 114, the second fixed trailing edge 116, the second inboard flap 118, and the second outboard flap 120 of FIG. 1 described above.

The distributed trailing edge wing flap system 300 of FIG. 3 also includes an example first actuator 302, an example second actuator 304, an example third actuator 306, an example fourth actuator 308, an example fifth actuator 310, an example sixth actuator 312, an example seventh actuator 314, and an example eighth actuator 316. In the illustrated example of FIG. 3, the first actuator 302 and the second actuator 304 are respectively coupled to the first inboard flap 112 and to the first wing 102. The third actuator 306 and the fourth actuator 308 are respectively coupled to the first outboard flap 114 and to the first wing 102. The fifth actuator 310 and the sixth actuator 312 are respectively coupled to the second inboard flap 118 and to the second wing 104. The seventh actuator 314 and the eighth actuator 316 are respectively coupled to the second outboard flap 120 and to the second wing 104.

The first, second, third, fourth, fifth, sixth, seventh and eighth actuators 302, 304, 306, 308, 310, 312, 314, 316 respectively move and/or actuate correspondingly coupled ones of the first inboard flap 112, the first outboard flap 114, the second inboard flap 118, and the second outboard flap 120 between respective retracted positions and respective deployed positions. For example, in the illustrated example of FIG. 3, the first actuator 302 and the second actuator 304 move and/or actuate the first inboard flap 112 between a retracted position (as shown in FIG. 3) and a deployed position relative the first fixed trailing edge 110 of the first wing 102. The third actuator 306 and the fourth actuator 308 move and/or actuate the first outboard flap 114 between a retracted position (as shown in FIG. 3) and a deployed position relative the first fixed trailing edge 110 of the first wing 102. The fifth actuator 310 and the sixth actuator 312 move and/or actuate the second inboard flap 118 between a retracted position (as shown in FIG. 3) and a deployed position relative the second fixed trailing edge 116 of the second wing 104. The seventh actuator 314 and the eighth actuator 316 move and/or actuate the second outboard flap 120 between a retracted position (as shown in FIG. 3) and a deployed position relative the second fixed trailing edge 116 of the second wing 104.

Although not visible in FIG. 3, respective ones of the first, second, third, fourth, fifth, sixth, seventh and eighth actuators 302, 304, 306, 308, 310, 312, 314, 316 include an actuator position feedback sensor to sense, measure and/or detect a position of the actuator. In some examples, the position of the actuator sensed, measured and/or detected via the actuator position feedback sensor may correspond to and/or indicate a position (e.g., a retracted position, a deployed position, etc.) of the corresponding wing flap to which the actuator is coupled. An actuator position feedback sensor that may be included in and/or implemented by respective ones of the first, second, third, fourth, fifth, sixth, seventh and eighth actuators 302, 304, 306, 308, 310, 312, 314, 316 of FIG. 3 is further described below in connection with FIG. 4.

The distributed trailing edge wing flap system 300 of FIG. 3 also includes an example first hydraulic module 318, an example second hydraulic module 320, an example third hydraulic module 322, an example fourth hydraulic module 324, an example fifth hydraulic module 326, an example sixth hydraulic module 328, an example seventh hydraulic module 330, and an example eighth hydraulic module 332. In some examples, the first, second, third and fourth hydraulic modules 318, 320, 322, 324 are located within the first wing 102, and the fifth, sixth, seventh and eighth hydraulic modules 326, 328, 330, 332 are located within the second wing 104. In the illustrated example of FIG. 3, the first hydraulic module 318 is operatively coupled to (e.g., in fluid communication with) the first actuator 302, the second hydraulic module 320 is operatively coupled to the second actuator 304, the third hydraulic module 322 is operatively coupled to the third actuator 306, the fourth hydraulic module 324 is operatively coupled to the fourth actuator 308, the fifth hydraulic module 326 is operatively coupled to the fifth actuator 310, the sixth hydraulic module 328 is operatively coupled to the sixth actuator 312, the seventh hydraulic module 330 is operatively coupled to the seventh actuator 314, and the eighth hydraulic module 332 is operatively coupled to the eighth actuator 316.

In some examples, respective ones of the first, third, fifth, and seventh hydraulic modules 318, 322, 326, 330 may be implemented according to a first configuration, and respective ones of the second, fourth, sixth, and eighth hydraulic modules 320, 324, 328, 332 may be implemented according to a second configuration. Hydraulic modules implemented according to the first configuration are referred to herein as "HM1" hydraulic modules. Example implementations of HM1 hydraulic modules are described below in connection with FIGS. 5-10. Hydraulic modules implemented according to the second configuration are referred to herein as "HM2" hydraulic modules. Example implementations of HM2 hydraulic modules are described below in connection with FIGS. 11-14.

The distributed trailing edge wing flap system 300 of FIG. 3 also includes an example first hydraulic system 334 powered by an example first engine 336, and an example second hydraulic system 338 powered by an example second engine 340. In the illustrated example of FIG. 3, the first engine 336 is coupled to the first wing 102, and the second engine 340 is coupled to the second wing 104. The first engine 336 powers the first hydraulic system 334 to supply pressurized hydraulic fluid to respective ones of the third, fourth, seventh and eighth hydraulic modules 322, 324, 330, 332. The second engine 340 powers the second hydraulic system 338 to supply pressurized hydraulic fluid to respective ones of the first, second, fifth and sixth hydraulic modules 318, 320, 326, 328.

Pressurized hydraulic fluid supplied via the first hydraulic system 334 of FIG. 3 to respective ones of the third, fourth, seventh and eighth hydraulic modules 322, 324, 330, 332 may be delivered to corresponding respective ones of the third, fourth, seventh and eighth actuators 306, 308, 314, 316 to move and/or actuate the third, fourth, seventh and eighth actuators 306, 308, 314, 316. Pressurized hydraulic fluid contained within respective ones of the third, fourth, seventh and eighth actuators 306, 308, 314, 316 may be returned to the first hydraulic system 334 via respective ones of the third, fourth, seventh and eighth hydraulic modules 322, 324, 330, 332. Pressurized hydraulic fluid supplied via the second hydraulic system 338 of FIG. 3 to respective ones of the first, second, fifth and sixth hydraulic modules 318, 320, 326, 328 may be delivered to corresponding respective ones of the first, second, fifth and sixth actuators 302, 304, 310, 312 to move and/or actuate the first, second, fifth and sixth actuators 302, 304, 310, 312. Pressurized hydraulic fluid contained within respective ones of the first, second, fifth and sixth actuators 302, 304, 310, 312 may be returned to the second hydraulic system 338 via respective ones of the first, second, fifth and sixth hydraulic modules 318, 320, 326, 328.

The distributed trailing edge wing flap system 300 of FIG. 3 also includes an example first REU 342, an example second REU 344, an example third REU 346, an example fourth REU 348, an example fifth REU 350, an example sixth REU 352, an example seventh REU 354, and an example eighth REU 356. In some examples, the first, second, third and fourth REUs 342, 344, 346, 348 are located within the first wing 102, and the fifth, sixth, seventh and eighth REUs 350, 352, 354, 356 are located within the second wing 104. In the illustrated example of FIG. 3, the first REU 342 is operatively coupled to (e.g., in electrical communication with) the first hydraulic module 318, the second REU 344 is operatively coupled to the second hydraulic module 320, the third REU 346 is operatively coupled to the third hydraulic module 322, the fourth REU 348 is operatively coupled to the fourth hydraulic module 324, the fifth REU 350 is operatively coupled to the fifth hydraulic module 326, the sixth REU 352 is operatively coupled to the sixth hydraulic module 328, the seventh REU 354 is operatively coupled to the seventh hydraulic module 330, and the eighth REU 356 is operatively coupled to the eighth hydraulic module 332. Respective ones of the first, second, third, fourth, fifth, sixth, seventh and eighth REUs 342, 344, 346, 348, 350, 352, 354, 356 control corresponding respective ones of the first, second, third, fourth, fifth, sixth, seventh and eighth hydraulic modules 318, 320, 322, 324, 326, 328, 330, 332, as further described below in connection with FIGS. 4-14.

In some examples, the first REU 342 is further operatively coupled to (e.g., in electrical communication with) the actuator position feedback sensor of the first actuator 302, the second REU 344 is further operatively coupled to the actuator position feedback sensor of the second actuator 304, the third REU 346 is further operatively coupled to the actuator position feedback sensor of the third actuator 306, the fourth REU 348 is further operatively coupled to the actuator position feedback sensor of the fourth actuator 308, the fifth REU 350 is further operatively coupled to the actuator position feedback sensor of the fifth actuator 310, the sixth REU 352 is further operatively coupled to the actuator position feedback sensor of the sixth actuator 312, the seventh REU 354 is further operatively coupled to the actuator position feedback sensor of the seventh actuator 314, and the eighth REU 356 is further operatively coupled to the actuator position feedback sensor of the eighth actuator 316. In such examples, respective ones of the first, second, third fourth, fifth, sixth, seventh and eighth REUs 342, 344, 346, 348, 350, 352, 354, 356 may control corresponding respective ones of the first, second, third, fourth, fifth, sixth, seventh and eighth hydraulic modules 318, 320, 322, 324, 326, 328, 330, 332 based on actuator position feedback data obtained by respective ones of the first, second, third fourth, fifth, sixth, seventh and eighth REUs 342, 344, 346, 348, 350, 352, 354, 356 from corresponding respective ones of the first, second, third, fourth, fifth, sixth, seventh and eighth actuator position feedback sensors of corresponding respective ones of the first, second, third, fourth, fifth, sixth, seventh and eighth actuators 302, 304, 306, 308, 310, 312, 314, 316, as further described below in connection with FIGS. 4-14.

The distributed trailing edge wing flap system 300 of FIG. 3 also includes an example first flap position sensor 358, an example second flap position sensor 360, an example third flap position sensor 362, an example fourth flap position sensor 364, an example fifth flap position sensor 366, an example sixth flap position sensor 368, an example seventh flap position sensor 370, and an example eighth flap position sensor 372. In the illustrated example of FIG. 3, the first flap position sensor 358 and the second flap position sensor 360 are respectively coupled to the first inboard flap 112 of the first wing 102. The third flap position sensor 362 and the fourth flap position sensor 364 are respectively coupled to the first outboard flap 114 of the first wing 102. The fifth flap position sensor 366 and the sixth flap position sensor 368 are respectively coupled to the second inboard flap 118 of the second wing 104. The seventh flap position sensor 370 and the eighth flap position sensor 372 are respectively coupled to the second outboard flap 120 of the second wing 104. Respective ones of the first, second, third, fourth, fifth, sixth, seventh and eighth flap position sensors 358, 360, 362, 364, 366, 368, 370, 372 sense, measure and/or detect a position of a correspondingly coupled one of the first inboard flap 112, the first outboard flap 114, the second inboard flap 118, and the second outboard flap 120. For example, the first flap position sensor 358 and the second flap position sensor 360 may respectively sense, measure and/or detect a position of the first inboard flap 112 of the first wing 102 relative to the first fixed trailing edge 110 of the first wing 102.

The distributed trailing edge wing flap system 300 of FIG. 3 also includes an example first FCEU 374, an example second FCEU 376, and an example flap lever 378. In some examples, the first FCEU 374 and the second FCEU 376 of FIG. 3 may be located within a fuselage of an aircraft (e.g., the fuselage 106 of the aircraft 100 of FIG. 1), and the flap lever 378 of FIG. 3 may be located in a cockpit area of the aircraft (e.g., the cockpit area 108 of the aircraft 100 of FIG. 1). The first FCEU 374 and the second FCEU 376 of FIG. 3 are respectively controlled and/or operated based on one or more input(s) received from the flap lever 378 of FIG. 3. In some examples, the position of the flap lever 378 may correspond to and/or otherwise be associated with a desired and/or commanded position and/or detent (e.g., flaps retracted, flaps thirty (F30), flaps forty (F40), etc.) of the first inboard flap 112, the first outboard flap 114, the second inboard flap 118, and/or the second outboard flap 120.

In the illustrated example of FIG. 3, the first FCEU 374 is operatively coupled to (e.g., in electrical communication with) respective ones of the first, second, fifth and sixth REUs 342, 344, 350, 352 via an example first databus 380. The first FCEU 374 may transmit and/or receive data (e.g., REU control data, hydraulic module control data, actuator position feedback sensor data, etc.) to and/from respective ones of the first, second, fifth and sixth REUs 342, 344, 350, 352 via the first databus 380. The first FCEU 374 is also operatively coupled to (e.g., in electrical communication with) respective ones of the first, second, fifth and sixth flap position sensors 358, 360, 366, 368. The first FCEU 374 may receive data (e.g., flap position sensor data) from respective ones of the first, second, fifth and sixth flap position sensors 358, 360, 366, 368.

The second FCEU 376 is operatively coupled to (e.g., in electrical communication with) respective ones of the third, fourth, seventh and eighth REUs 346, 348, 354, 356 via an example second databus 382. The second FCEU 376 may transmit and/or receive data (e.g., REU control data, hydraulic module control data, actuator position feedback sensor data, etc.) to and/from respective ones of the third, fourth, seventh and eighth REUs 346, 348, 354, 356 via the second databus 382. The second FCEU 376 is also operatively coupled to (e.g., in electrical communication with) respective ones of the third, fourth, seventh and eighth flap position sensors 362, 364, 370, 372. The second FCEU 376 may receive data (e.g., flap position sensor data) from respective ones of the third, fourth, seventh and eighth flap position sensors 362, 364, 370, 372.

In the illustrated example of FIG. 3, the first FCEU 374 controls an example first switch 384 to selectively provide electrical power generated by an example first generator 386 of the first engine 336 to respective ones of the first and fifth hydraulic modules 318, 326. The second FCEU 376 controls an example second switch 388 to selectively provide electrical power generated by an example second generator 390 of the second engine 340 to respective ones of the third and seventh hydraulic modules 322, 330. As briefly discussed above and further described herein, the first, third, fifth and seventh hydraulic modules 318, 322, 326, 330 of FIG. 3 may be implemented as HM1 hydraulic modules.

In some examples, the first switch 384 and/or the second switch 388 may respectively be actuated to a closed position following and/or in response to a failure of the first hydraulic system 334 and/or a failure of the second hydraulic system 338 of FIG. 3. In response to the first FCEU 374 actuating the first switch 384 to the closed position, electrical power generated by the first generator 386 is provided to respective ones of the first and fifth hydraulic modules 318, 326. The provided electrical power causes respective ones of the first and fifth hydraulic modules 318, 326 to provide auxiliary pressurized hydraulic fluid (e.g., from a fluid compensator) maintained in the first and fifth hydraulic modules 318, 326 to corresponding ones of the first actuator 302 and the fifth actuator 310 to move and/or actuate corresponding ones of the first inboard flap 112 and the second inboard flap 118 to a predetermined position (e.g., flaps thirty (F30), flaps forty (F40), etc.). In response to the second FCEU 376 actuating the second switch 388 to the closed position, electrical power generated by the second generator 390 is provided to respective ones of the third and seventh hydraulic modules 322, 330. The provided electrical power causes respective ones of the third and seventh hydraulic modules 322, 330 to provide auxiliary pressurized hydraulic fluid (e.g., from a fluid compensator) maintained in the third and seventh hydraulic modules 322, 330 to corresponding ones of the third actuator 306 and the seventh actuator 314 to move and/or actuate corresponding ones of the first outboard flap 114 and the second outboard flap 120 to a predetermined position (e.g., flaps thirty (F30), flaps forty (F40), etc.).

Figure 4:
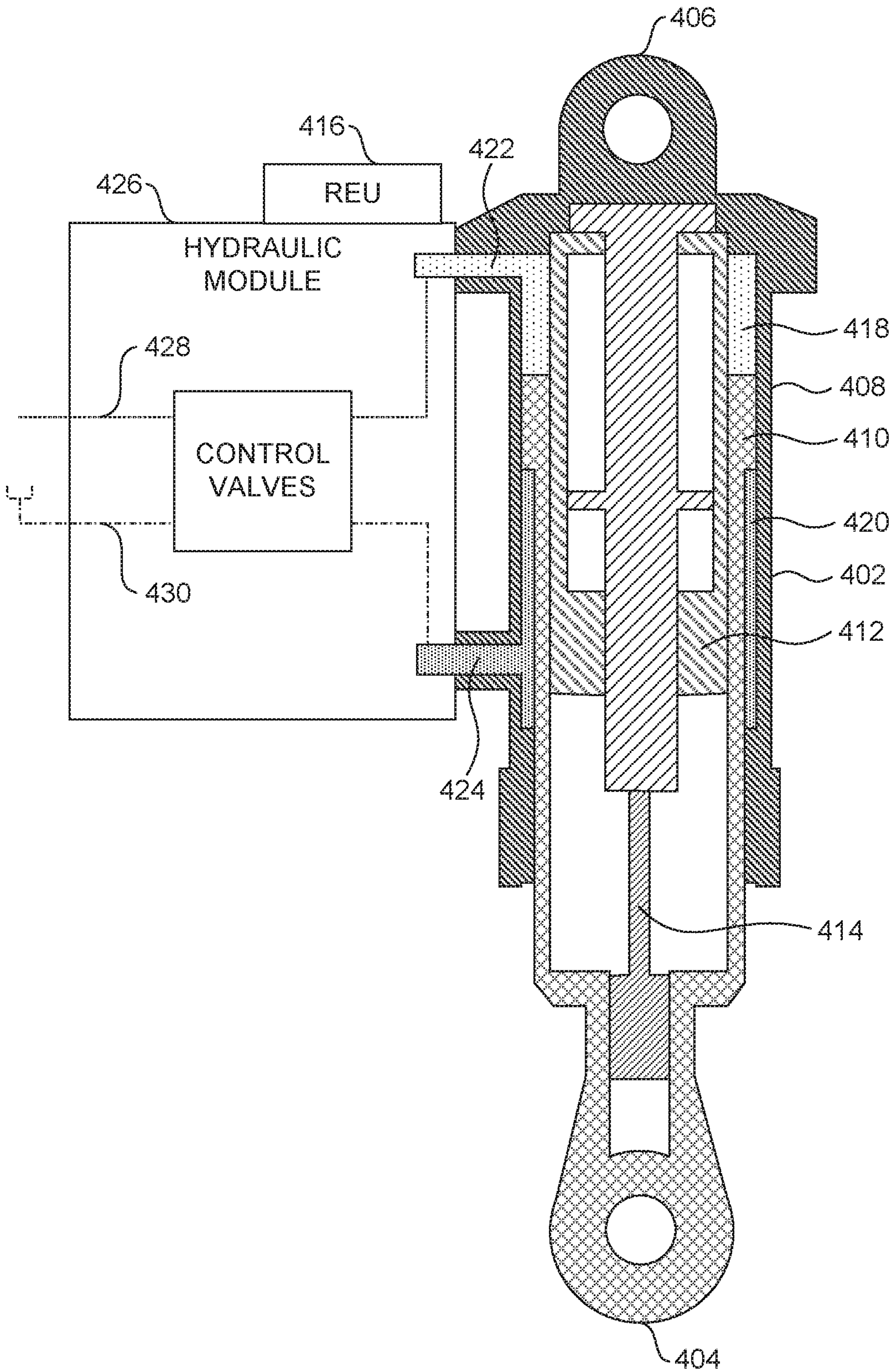
FIG. 4 is a schematic of an example actuator that may be implemented in the example distributed trailing edge wing flap system of FIG. 3.

FIG. 4 is a schematic of an example actuator 402 that may be implemented in the example distributed trailing edge wing flap system 300 of FIG. 3. For example, any of the first, second, third, fourth, fifth, sixth, seventh and/or eighth actuators 302, 304, 306, 308, 310, 312, 314, 316 of FIG. 3 may be implemented by the actuator 402 of FIG. 4. In the illustrated example of FIG. 4, the actuator 402 includes an example first end 404, an example second end 406 located opposite the first end 404, an example cylinder 408, an example piston 410, an example balance tube 412, an example linear variable differential transducer (LVDT) 414, an example REU 416, an example first fluid volume 418, an example second fluid volume 420, an example first port 422, and example second port 424.

In the illustrated example of FIG. 4, the first end 404 of the actuator 402 may be coupled to a wing flap (e.g., the first inboard flap 112, the first outboard flap 114, the second inboard flap 118, or the second outboard flap 120 of FIGS. 1 and 3), and the second end 406 of the actuator 402 may be coupled to a corresponding wing (e.g., the first wing 102 of the second wing 104 of FIGS. 1 and 3). The cylinder 408 and the piston 410 have respective fixed lengths. The piston 410 is positioned, disposed, and/or received within the cylinder 408 and is movable and/or slidable relative to the cylinder 408 between a retracted position and an extended position. In some examples, the actuator 402 of FIG. 4 has a first length when the piston 410 is in the retracted position relative to the cylinder 408, and a second length greater than the first length when the piston 410 is in the extended position relative to the cylinder 408.

The piston 410 of FIG. 4 is located and/or positioned within the cylinder 408 between the first fluid volume 418 and the second fluid volume 420. In the illustrated example of FIG. 4, the piston 410 has an annular shape such that the piston 410 surrounds, circumscribes, and/or rides on the balance tube 412. The LVDT 414 of FIG. 4 is located within the balance tube 412 and/or the piston 410. The LVDT 414 senses, measures and/or detects a position (e.g., a retracted position, an extended position, etc.) of the piston 410 of FIG. 4. Any of the first, second, third, fourth, fifth, sixth, seventh and/or eighth actuator position feedback sensors described above in connection with FIG. 3 may be implemented by the LVDT 414 of FIG. 4. The LVDT 414 of FIG. 4 is operatively coupled to (e.g., in electrical communication with) the REU 416 of FIG. 4 such that the REU 416 may receive and/or obtain actuator position feedback data sensed, measured and/or detected via the LVDT 414. The REU 416 of FIG. 4 is also operatively coupled to (e.g., in electrical communication with) an example hydraulic module 426. The REU 416 of FIG. 4 includes one or more processor(s) to control and/or manage loop closure, failure detection, and/or actuation control commands associated with the hydraulic module 426. In some examples, the REU 416 of FIG. 4 may be located adjacent the actuator 402 of FIG. 4. In other examples, the REU 416 of FIG. 4 may be integrated into the actuator 402 of FIG. 4. Any of the first, second, third, fourth, fifth, sixth, seventh and/or eighth REUs 342, 344, 346, 348, 350, 352, 354, 356 of FIG. 3 may be implemented by the REU 416 of FIG. 4.

The first fluid volume 418 of FIG. 4 includes and/or is a first volume of pressurized hydraulic fluid. In the illustrated example of FIG. 4, the first fluid volume 418 is in fluid communication with the first port 422 of the actuator 402, and is bounded by the cylinder 408, the piston 410, and the balance tube 412. The second fluid volume 420 of FIG. 4 includes and/or is a second volume of pressurized hydraulic fluid that is isolated from the first volume of pressurized hydraulic fluid. In the illustrated example of FIG. 4, the second fluid volume 420 is in fluid communication with the second port 424 of the actuator 402, and is bounded by the cylinder 408 and the piston 410. The first fluid volume 418 and the second fluid volume 420 of FIG. 4 are slightly unbalanced as a result of the piston 410 riding on the balance tube 412. In some examples, one or more seal(s) may be coupled to and/or disposed on the piston 410. In such examples, the seal(s) of the piston 410 may provide one or more interface(s) between the piston 410 and the cylinder 408, and/or between the piston 410 and the balance tube 412, to isolate the first fluid volume 418 from the second fluid volume 420.

Increasing the first fluid volume 418 of FIG. 4 (e.g., increasing the volume of the pressurized hydraulic fluid of the first fluid volume 418) causes the piston 410 of FIG. 4 to move and/or slide relative to the cylinder 408 of FIG. 4 away from a retracted position and toward an extended position. A wing flap coupled to the first end 404 of the actuator 402 may move away from a retracted position and toward a deployed position in response to the piston 410 moving away from the retracted position and toward the extended position. In the illustrated example of FIG. 4, the first fluid volume 418 has a minimum volume when the piston 410 is in the retracted position, and has a maximum volume when the piston 410 is in the extended position.

Increasing the second fluid volume 420 of FIG. 4 (e.g., increasing the volume of the pressurized hydraulic fluid of the second fluid volume 420) causes the piston 410 of FIG. 4 to move and/or slide relative to the cylinder 408 of FIG. 4 away from an extended position and toward a retracted position. A wing flap coupled to the first end 404 of the actuator 402 may move away from a deployed position and toward a retracted position in response to the piston 410 moving away from the extended position and toward the retracted position. In the illustrated example of FIG. 4, the second fluid volume 420 has a minimum volume when the piston 410 is in the extended position, and has a maximum volume when the piston 410 is in the retracted position.

The hydraulic module 426 of FIG. 4 is operatively coupled to (e.g., in fluid communication with) the actuator 402 of FIG. 4 and is also operatively coupled to (e.g., in electrical communication with) the REU 416 of FIG. 4. In the illustrated example of FIG. 4, the hydraulic module 426 includes and/or is in fluid communication with an example supply line 428 and an example return line 430. In some examples, the supply line 428 and the return line 430 are associated with a hydraulic system of an aircraft (e.g., the first hydraulic system 334 or the second hydraulic system 338 of FIG. 3).

The hydraulic module 426 of FIG. 4 may selectively place the supply line 428 in fluid communication with either the first port 422 or the second port 424 of the actuator 402 to selectively provide pressurized hydraulic fluid to the first fluid volume 418 or the second fluid volume 420 of the actuator 402. The hydraulic module 426 of FIG. 4 may also selectively place the return line 430 in fluid communication with either the first port 422 or the second port 424 of the actuator 402 to selectively receive pressurized hydraulic fluid from the first fluid volume 418 or the second fluid volume 420 of the actuator 402. Any of the first, second, third, fourth, fifth, sixth, seventh and/or eighth hydraulic modules 318, 320, 32, 324, 326, 328, 330, 332 of FIG. 3 may be implemented by the hydraulic module 426 of FIG. 4. In some examples, the hydraulic module 426 of FIG. 4 may be implemented as an HM1 hydraulic module, as further described below in connection with FIGS. 5-10. In other examples, the hydraulic module 426 of FIG. 4 may be implemented as an HM2 hydraulic module, as further described below in connection with FIGS. 11-14.

Figure 5:
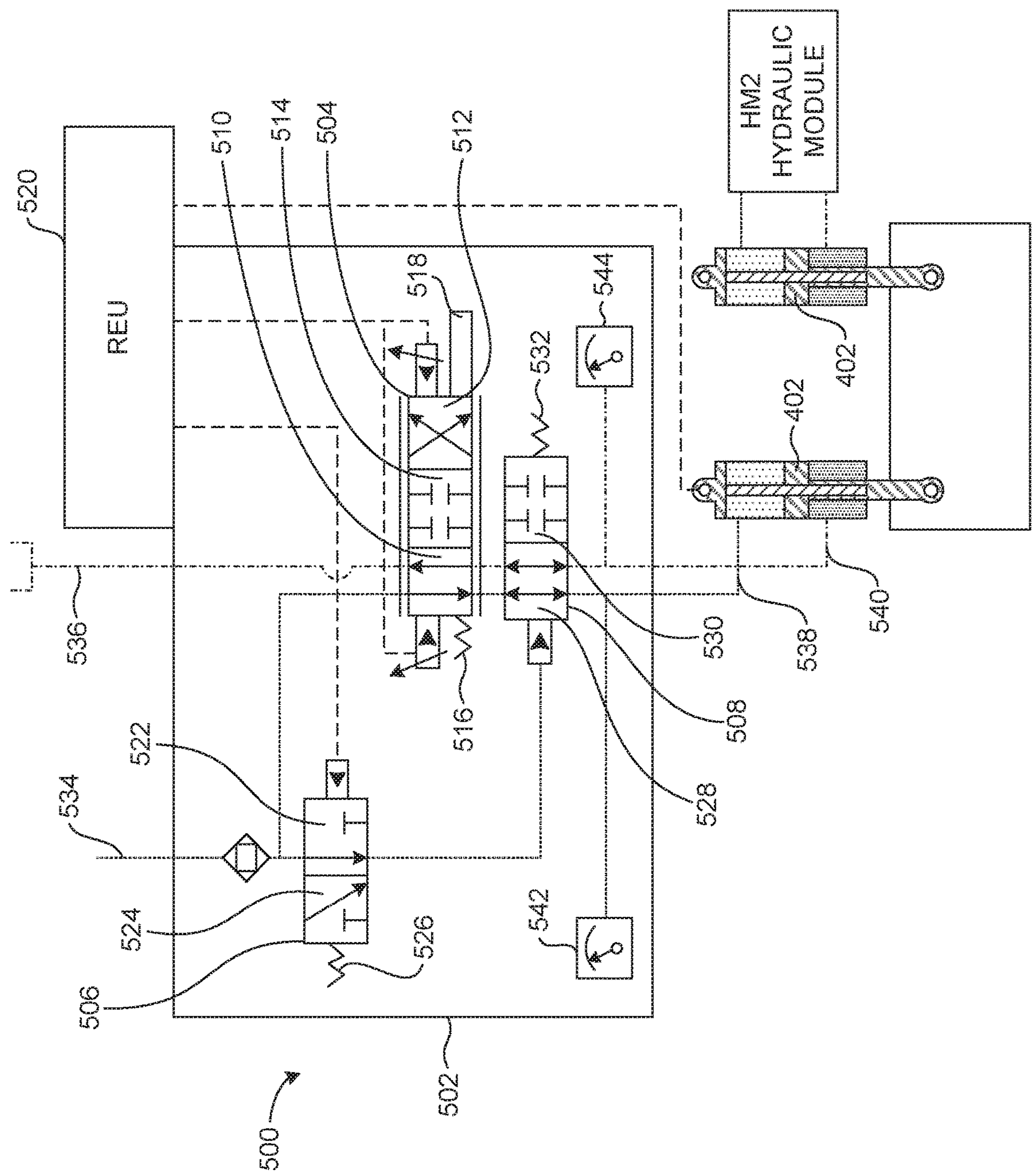
FIG. 5 is a schematic of an example HM1 hydraulic module in an example first operational state of a first mode.
Figure 6:
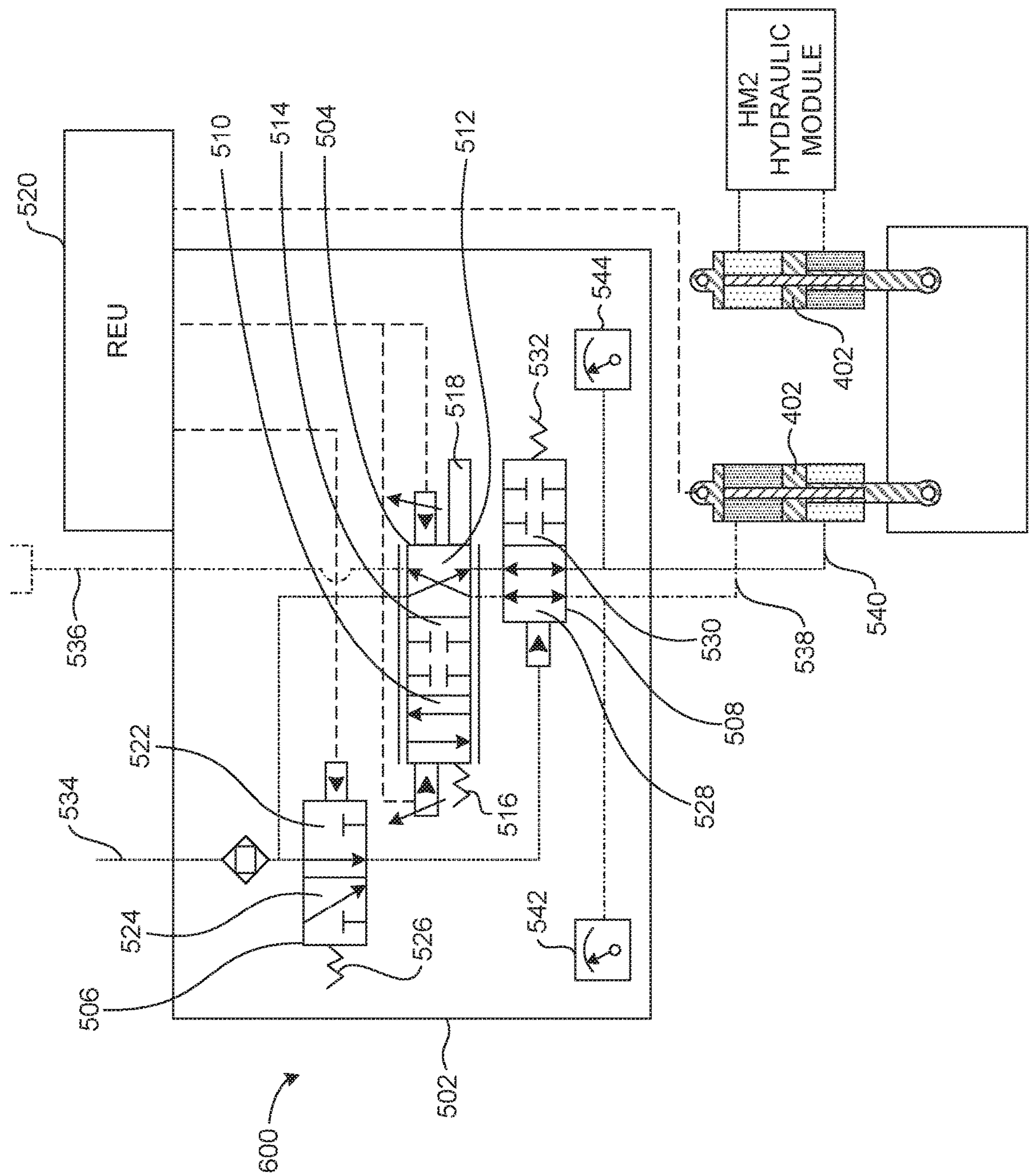
FIG. 6 is a schematic of the example HM1 hydraulic module of FIG. 5 in an example second operational state of the first mode.
Figure 7:
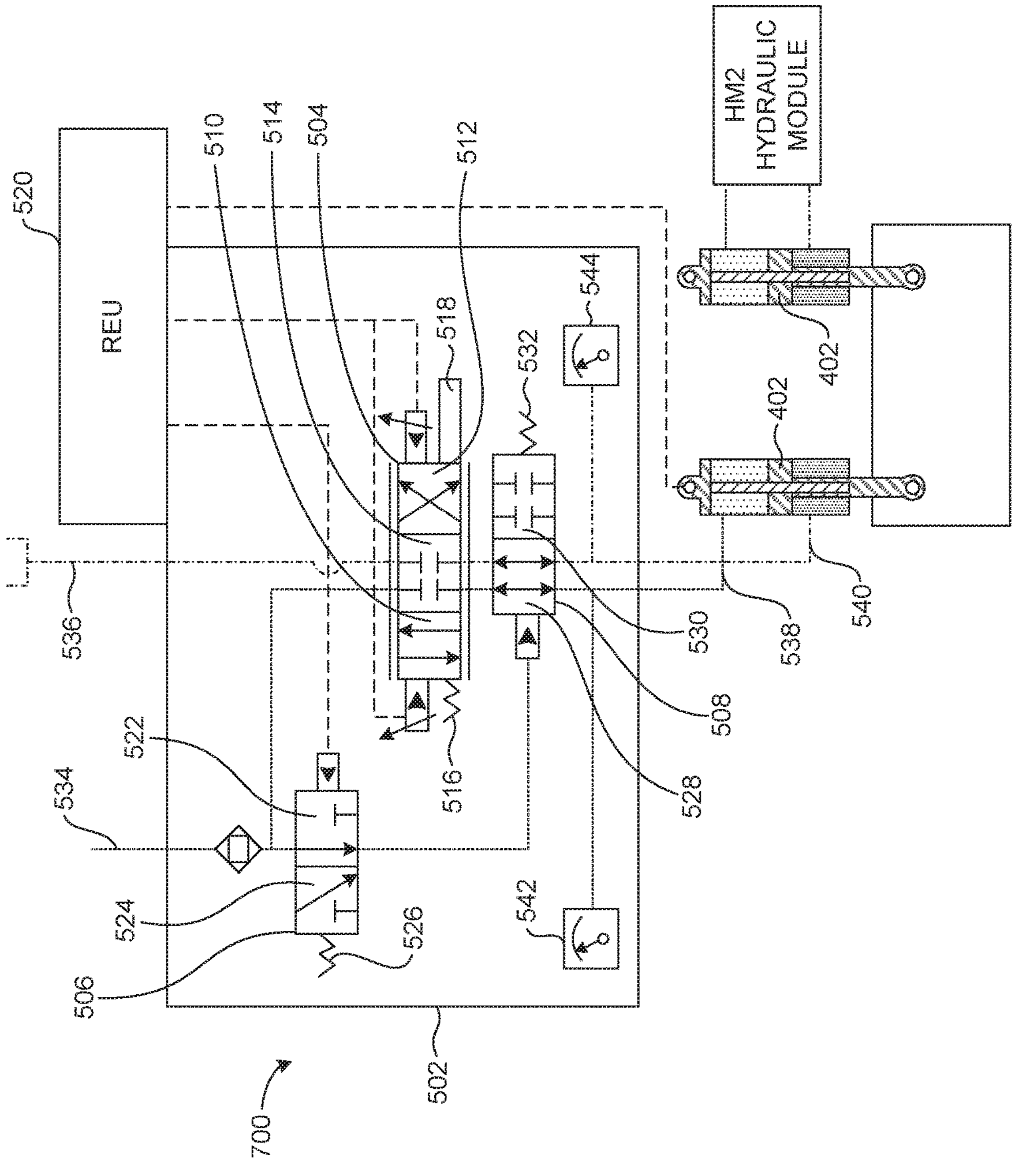
FIG. 7 is a schematic of the example HM1 hydraulic module of FIGS. 5 and 6 in an example third operational state of the first mode.
Figure 8:
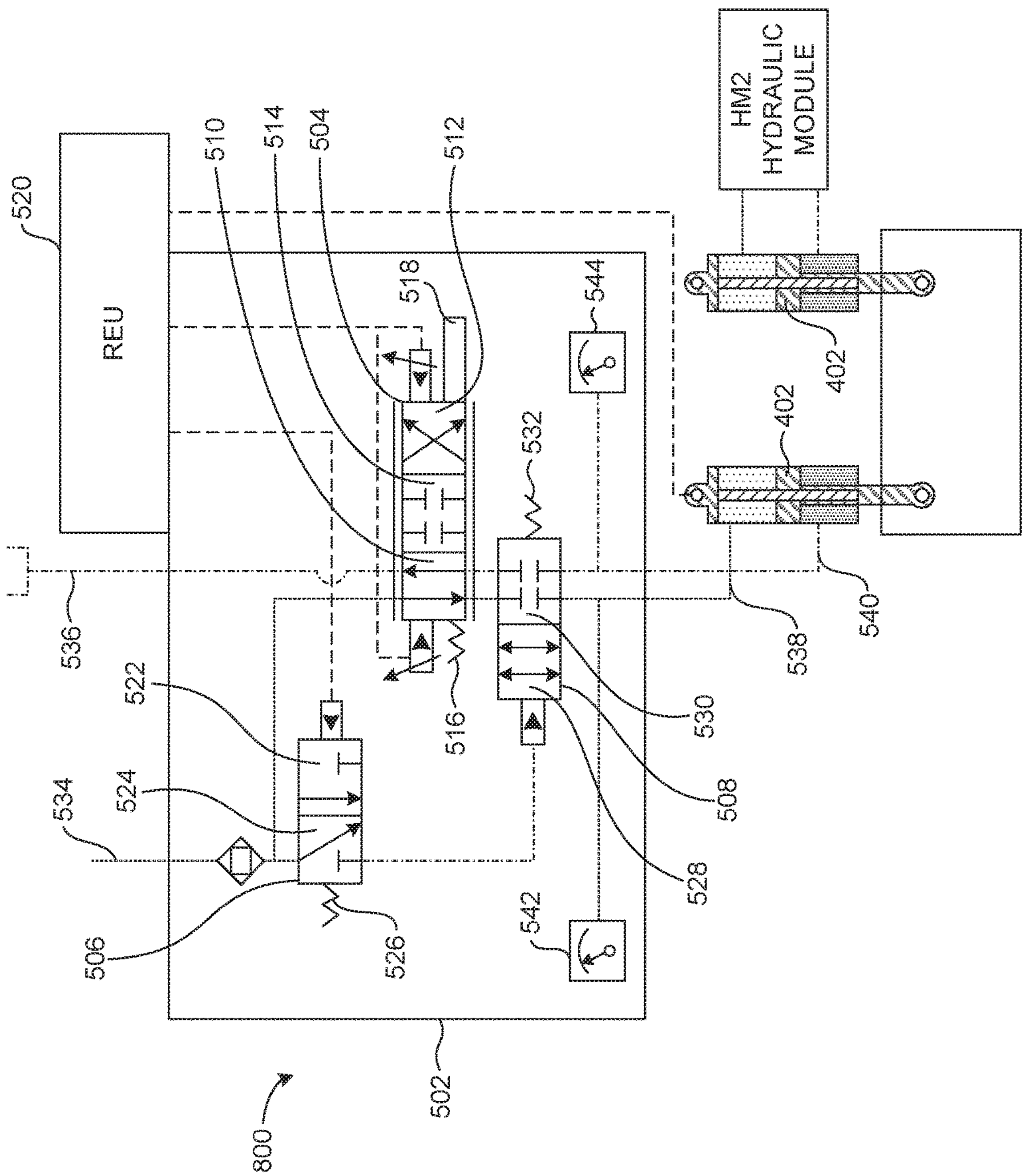
FIG. 8 is a schematic of the example HM1 hydraulic module of FIGS. 5-7 in an example operational state of a second mode.

FIG. 5 is a schematic of an example HM1 hydraulic module 502 in an example first operational state 500 of a first mode. FIG. 6 is a schematic of the example HM1 hydraulic module 502 of FIG. 5 in an example second operational state 600 of the first mode. FIG. 7 is a schematic of the example HM1 hydraulic module 502 of FIGS. 5 and 6 in an example third operational state 700 of the first mode. FIG. 8 is a schematic of the example HM1 hydraulic module 502 of FIGS. 5-7 in an example operational state 800 of a second mode. The first mode of FIGS. 5-7 corresponds to a normal mode of operation of the HM1 hydraulic module 502 and/or, more generally, the distributed trailing edge wing flap system 300 of FIG. 3, in which the first hydraulic system 334 and/or the second hydraulic system 338 is/are operating according to normal and/or intended conditions. The second mode of FIG. 8 corresponds to a failure mode of operation of the HM1 hydraulic module 502 and/or, more generally, the distributed trailing edge wing flap system 300 of FIG. 3, in which the first hydraulic system 334 and/or the second hydraulic system 338 is/are not operating according to normal and/or intended conditions (e.g., due to a partial or complete loss of pressure associated with the first hydraulic system 334 and/or the second hydraulic system 338).

In the illustrated examples of FIGS. 5-8, the HM1 hydraulic module 502 includes an example electrohydraulic servo valve (EHSV) 504, an example solenoid valve (SOV) 506, and an example mode selector valve (MSV) 508. The EHSV 504 of FIGS. 5-8 is a four-way flow-control valve that produces flow as a function of input current. The EHSV 504 has three control ports that are movable and/or actuatable between an example first control port position 510 (e.g., a flap deployment flow position), an example second control port position 512 (e.g., a flap retraction flow position), and an example third control port position 514 (e.g., a null region). The EHSV 504 includes and/or is coupled to an example first bias spring 516 and an example LVDT 518. The first bias spring 516 biases the EHSV 504 into and/or toward the first control port position 510 of the EHSV 504. The LVDT 518 senses, measures and/or detects a position of the EHSV 504. In the illustrated example of FIGS. 5-8, the EHSV 504 is operatively coupled to (e.g., in electrical communication with) an example REU 520. The REU 520 selectively positions the EHSV 504 in one of the first, second, or third control port positions 510, 512, 514 of the EHSV 504. For example, the REU 520 may energize the EHSV 504 to move from the first control port position 510 into the second control port position 512 over the bias generated by the first bias spring 516. In some examples, the REU 520 transmits a control signal to the EHSV 504 to control the position of the EHSV 504. The REU 520 also receives an electrical signal from an LVDT of actuator (e.g., the LVDT 414 of the actuator 402) associated with the REU 520 and the HM1 hydraulic module 502.

The SOV 506 of FIGS. 5-8 is a two-position valve having pilot ports that are movable and/or actuatable between an example first pilot port position 522 (e.g., a normal pilot flow position) and an example second pilot port position 524 (e.g., a diverted pilot flow position). The SOV 506 includes and/or is coupled to an example second bias spring 526. The second bias spring 526 biases the SOV 506 into and/or toward the second pilot port position 524 of the SOV 506. In the illustrated example of FIGS. 5-8, the SOV 506 is operatively coupled to (e.g., in electrical communication with) the REU 520. The REU 520 selectively positions the SOV 506 in one of the first or second pilot port positions 522, 524 of the SOV 506. For example, the REU 520 may energize and/or electrically command the SOV 506 to move from the second pilot port position 524 into the first pilot port position 522 over the bias generated by the second bias spring 526. In some examples, the REU 520 may de-energize the SOV 506 in response to detecting and/or determining that a difference between an electrical signal from the LVDT 518 of the EHSV 504 and a calculated position of the EHSV 504 exceeds a threshold (e.g., a predetermined threshold), as may occur in the case of a run-away and/or improperly functioning actuator.

The MSV 508 is a two-position valve having flow ports that are movable and/or actuatable between an example first flow port position 528 (e.g., a normal flow position) and an example second flow port position 530 (e.g., a blocked flow position). The MSV 508 includes and/or is coupled to an example third bias spring 532. The third bias spring 532 biases the MSV 508 into and/or toward the second flow port position 530 of the MSV 508. In the illustrated example of FIGS. 5-8, the MSV 508 is operatively coupled to (e.g., in fluid communication with) the SOV 506 of FIGS. 5-8. The SOV 506 selectively positions the MSV 508 in one of the first or second flow port positions 528, 530 of the MSV 508. For example, the SOV 506 may supply pressurized hydraulic fluid to the MSV 508 to move the MSV 508 from the second flow port position 530 into the first flow port position 528 over the bias generated by the third bias spring 532.

The HM1 hydraulic module 502 of FIGS. 5-8 includes and/or is in fluid communication with an example supply line 534 and an example return line 536. In some examples, the supply line 534 and the return line 536 are associated with and/or in fluid communication with a hydraulic system of an aircraft (e.g., the first hydraulic system 334 or the second hydraulic system 338 of FIG. 3). In the illustrated examples of FIGS. 5-8, the supply line 534 is in fluid communication with the EHSV 504 and the SOV 506. The return line 536 is in fluid communication with the EHSV 504. The HM1 hydraulic module 502 of FIGS. 5-8 also includes and/or is in fluid communication with an example first fluid line 538 and an example second fluid line 540. In the illustrated examples of FIGS. 5-8, the first fluid line 538 is in fluid communication with the MSV 508 and a first port and/or a first fluid volume of an actuator (e.g., the first port 422 and/or the first fluid volume 418 of the actuator 402 of FIG. 4). The second fluid line 540 is in fluid communication with the MSV 508 and a second port and/or a second fluid volume of the actuator (e.g., the second port 424 and/or the second fluid volume 420 of the actuator 402 of FIG. 4).

The HM1 hydraulic module 502 of FIGS. 5-8 also includes an example first pressure transducer 542 in fluid communication with the first fluid line 538 and an example second pressure transducer 544 in fluid communication with the second fluid line 540. The first pressure transducer 542 senses, measures and/or detects a pressure of the hydraulic fluid in the first fluid line 538 and converts the detected pressure into an electrical signal. The second pressure transducer 544 senses, measures and/or detects a pressure of the hydraulic fluid in the second fluid line 540 and converts the detected pressure into an electrical signal. Data acquired by and/or from the first pressure transducer 542 and/or the second pressure transducer 544 may be used to evaluate the health, operability, and/or functionality of an actuator that is operatively coupled to the first fluid line 538 and the second fluid line 540.

As further described below, the EHSV 504, the SOV 506, and/or the MSV 508 of the HM1 hydraulic module 502 may be moved and/or actuated to selectively place the supply line 534 in fluid communication with the first fluid line 538 or the second fluid line 540 to selectively provide pressurized hydraulic fluid to a first port or a second port of an actuator (e.g., the first port 422 or the second port 424 of the actuator 402 of FIG. 4). The EHSV 504, the SOV 506, and/or the MSV 508 of the HM1 hydraulic module 502 may also be moved and/or actuated to selectively place the return line 536 in fluid communication with the first fluid line 538 or the second fluid line 540 to selectively receive pressurized hydraulic fluid from the first port or the second port of the actuator (e.g., the first port 422 or the second port 424 of the actuator 402 of FIG. 4).

FIG. 5 illustrates the HM1 hydraulic module 502 of FIGS. 5-8 in the first operational state 500 of the first and/or normal mode. As shown in FIG. 5, the EHSV 504 is positioned in the first control port position 510, the SOV 506 is positioned in the first pilot port position 522, and the MSV 508 is positioned in the first flow port position 528. The EHSV 504 is energized and/or electrically commanded into the first control port position 510 via the REU 520. The SOV 506 is energized and/or electrically commanded into the first pilot port position 522 via the REU 520. The MSV 508 is hydraulically actuated into the first flow port position 528 via a pilot pressure received at the MSV 508 from the SOV 506.

In the illustrated example of FIG. 5, pressurized hydraulic fluid from the supply line 534 passes through the EHSV 504, through the MSV 508, through the first fluid line 538, and into a first fluid volume of an actuator via a first port of the actuator (e.g., the first fluid volume 418 of the actuator 402 via the first port 422 of FIG. 4). A piston of the actuator (e.g., the piston 410 of the actuator 402 of FIG. 4) moves away from a retracted position and toward an extended position in response to an increase in the first fluid volume. Movement of the piston away from the retracted position and toward the extended position decreases a second fluid volume of the actuator (e.g., the second fluid volume 420 of the actuator 402 of FIG. 4). As the second fluid volume decreases, pressurized hydraulic fluid contained within the second fluid volume passes from the second fluid volume of the actuator via a second port (e.g., the second port 424 of FIG. 4) through the second fluid line 540, through the MSV 508, through the EHSV 504, and into the return line 536.

FIG. 6 illustrates the HM1 hydraulic module 502 of FIGS. 5-8 in the second operational state 600 of the first and/or normal mode. As shown in FIG. 6, the EHSV 504 is positioned in the second control port position 512, the SOV 506 is positioned in the first pilot port position 522, and the MSV 508 is positioned in the first flow port position 528. The EHSV 504 is energized and/or electrically commanded into the second control port position 512 via the REU 520. The SOV 506 is energized and/or electrically commanded into the first pilot port position 522 via the REU 520. The MSV 508 is hydraulically actuated into the first flow port position 528 via a pilot pressure received at the MSV 508 from the SOV 506.

In the illustrated example of FIG. 6, pressurized hydraulic fluid from the supply line 534 passes through the EHSV 504, through the MSV 508, through the second fluid line 540, and into a second fluid volume of an actuator via a second port of the actuator (e.g., the second fluid volume 420 of the actuator 402 via the second port 424 of FIG. 4). A piston of the actuator (e.g., the piston 410 of the actuator 402 of FIG. 4) moves away from an extended position and toward a retracted position in response to an increase in the second fluid volume. Movement of the piston away from the extended position and toward the retracted position decreases a first fluid volume of the actuator (e.g., the first fluid volume 418 of the actuator 402 of FIG. 4). As the first fluid volume decreases, pressurized hydraulic fluid contained within the first fluid volume passes from the first fluid volume of the actuator via a first port (e.g., the first port 422 of FIG. 4) through the first fluid line 538, through the MSV 508, through the EHSV 504, and into the return line 536.

FIG. 7 illustrates the HM1 hydraulic module 502 of FIGS. 5-8 in the third operational state 700 of the first and/or normal mode. As shown in FIG. 7, the EHSV 504 is positioned in the third control port position 514, the SOV 506 is positioned in the first pilot port position 522, and the MSV 508 is positioned in the first flow port position 528. The EHSV 504 is energized and/or electrically commanded into the third control port position 514 via the REU 520. The SOV 506 is energized and/or electrically commanded into the first pilot port position 522 via the REU 520. The MSV 508 is hydraulically actuated into the first flow port position 528 via a pilot pressure received at the MSV 508 from the SOV 506.

In the illustrated example of FIG. 7, the EHSV 504 is positioned in the third control port position 514 via the REU 520. When positioned as such, the EHSV 504 supplies zero control flow at zero load pressure drop to the MSV 508. The EHSV 504 will move from the third control port position 514 to either the first control port position 510 or the second control port position 512 in response to an aerodynamic load applied to a wing flap associated with the HM1 hydraulic module 502, and/or in response to the system commanded flap position (e.g., from the REU 520 and/or an FCEU).

FIG. 8 illustrates the HM1 hydraulic module 502 of FIGS. 5-8 in the operational state 800 of the second and/or failure mode. The operational state 800 may occur, for example, in connection with a system power-off condition (e.g., aircraft on ground and parked) or in connection with a failure which may be hydraulic (e.g., a failure of a hydraulic system of the aircraft) or electrical (e.g., a failure of an REU of the aircraft). As shown in FIG. 8, the EHSV 504 is positioned in the first control port position 510, the SOV 506 is positioned in the second pilot port position 524, and the MSV 508 is positioned in the second flow port position 530. The EHSV 504 is de-energized via the REU 520, thereby causing the first bias spring 516 to move the EHSV 504 into the first control port position 510. The SOV 506 is de-energized via the REU 520, thereby causing the second bias spring 526 to move the SOV 506 into the second pilot port position 524. A pilot pressure provided from the SOV 506 to the MSV 508 is diverted and/or lost in response to the SOV 506 being positioned in the second pilot port position 524. The diversion and/or loss of the pilot pressure causes the third bias spring 532 to move the MSV 508 into the second flow port position 530.

In the illustrated example of FIG. 8, the MSV 508 blocks the pressurized hydraulic fluid of the supply line 534 from passing into the first fluid line 538. The MSV 508 also blocks the pressurized hydraulic fluid from passing into the return line 536 from the second fluid line 540. The flow of pressurized hydraulic fluid to and/or from a first fluid volume and/or a second fluid volume of an actuator (e.g., the first fluid volume 418 and/or the second fluid volume 420 of the actuator 402 of FIG. 4) is accordingly interrupted. The interruption of flow prevents a piston of the actuator (e.g., the piston 410 of the actuator 402 of FIG. 4) from moving. The position of the piston and/or the position of a wing flap to which the piston is coupled is/are accordingly locked and/or fixed when the HM1 hydraulic module 502 is in the operational state 800 of the second and/or failure mode of FIG. 8. The interruption accordingly maintains the last flap commanded position when a failure occurs, whether the failure be hydraulic or electrical.

The operational state 800 of FIG. 8 described above may be avoided and/or reversed in the HM1 hydraulic module 502 of FIGS. 5-8 by incorporating an electrically-powered LPU into the HM1 hydraulic module 502. In some examples, the LPU of the HM1 hydraulic module 502 operates independently of the first hydraulic system 334 and/or the second hydraulic system 338. For example, the LPU of the HM1 hydraulic module 502 may supply pressurized hydraulic fluid generated and/or contained by the LPU to the EHSV 504 and the SOV 506 of the HM1 hydraulic module 502 when the first hydraulic system 334 and/or the second hydraulic system 338 is/are not operating according to normal and/or intended conditions (e.g., due to a partial or complete loss of pressure associated with the first hydraulic system 334 and/or the second hydraulic system 338). The pressurized hydraulic fluid supplied by the LPU may restore the movement and/or positioning capabilities of the piston of the actuator and/or the wing flap to which the piston of the actuator is coupled following a partial or complete loss of pressure associated with the first hydraulic system 334 and/or the second hydraulic system 338. The LPU may accordingly prevent the HM1 hydraulic module 502 of FIGS. 5-8 from entering, and/or remove the HM1 hydraulic module 502 from being in, the operational state 800 of FIG. 8 described above.

In other examples, the LPU of the HM1 hydraulic module 502 may supply pressurized hydraulic fluid generated and/or contained by the LPU to the EHSV 504 and the SOV 506 of the HM1 hydraulic module 502 at a time when the first hydraulic system 334 and/or the second hydraulic system 338 is/are operating according to normal and/or intended conditions. In such other examples, the pressurized hydraulic fluid supplied by the LPU may maintain the movement and/or positioning capabilities of the piston of the actuator and/or the wing flap to which the piston of the actuator is coupled following a partial or complete loss of pressure associated with the first hydraulic system 334 and/or the second hydraulic system 338. The LPU may accordingly prevent the HM1 hydraulic module 502 of FIGS. 5-8 from entering the operational state 800 of FIG. 8 described above.

Figure 9:
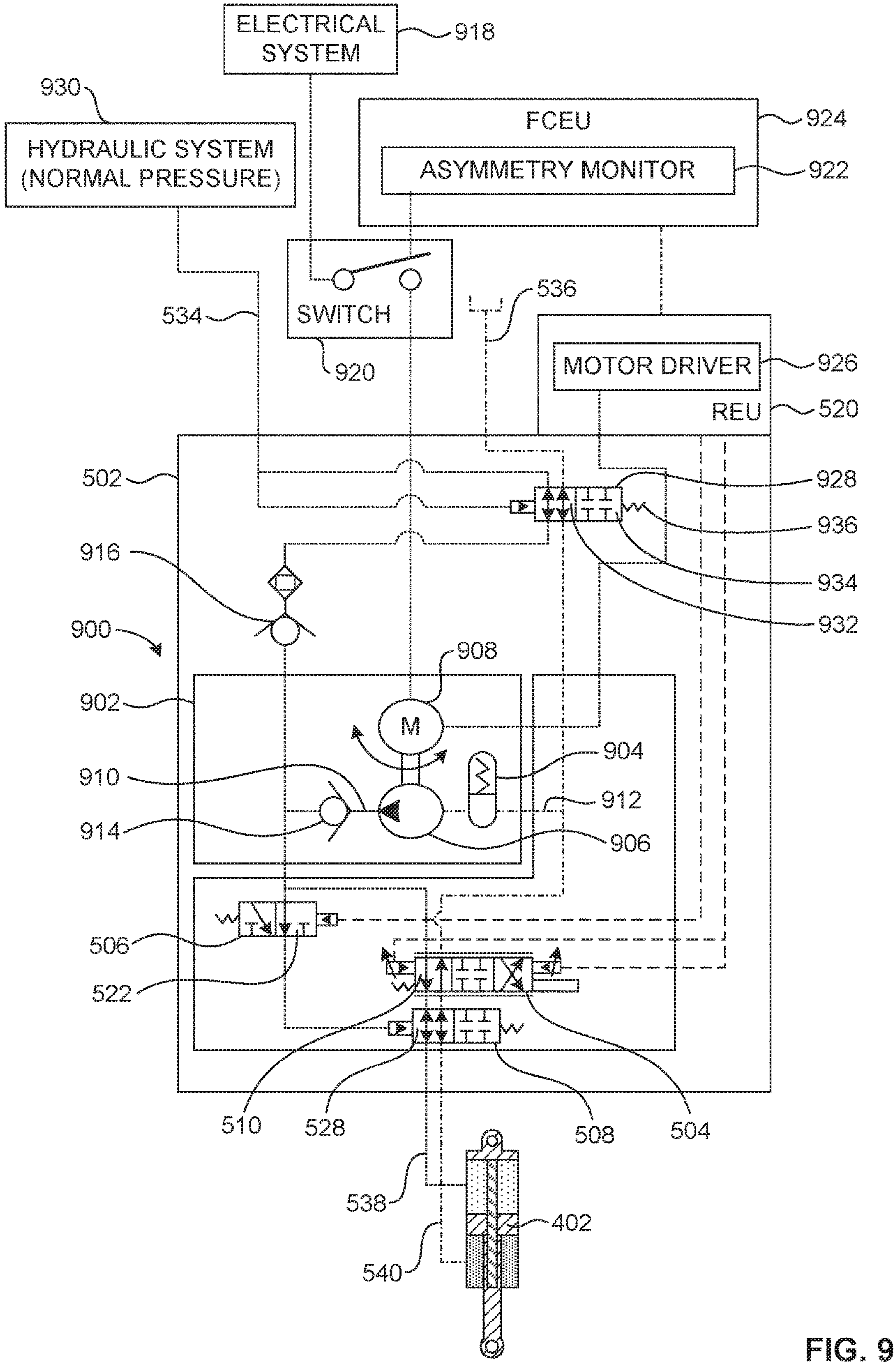
FIG. 9 is a schematic of an example LPU of the example HM1 hydraulic module of FIGS. 5-8 in an example first operational state.
Figure 10:
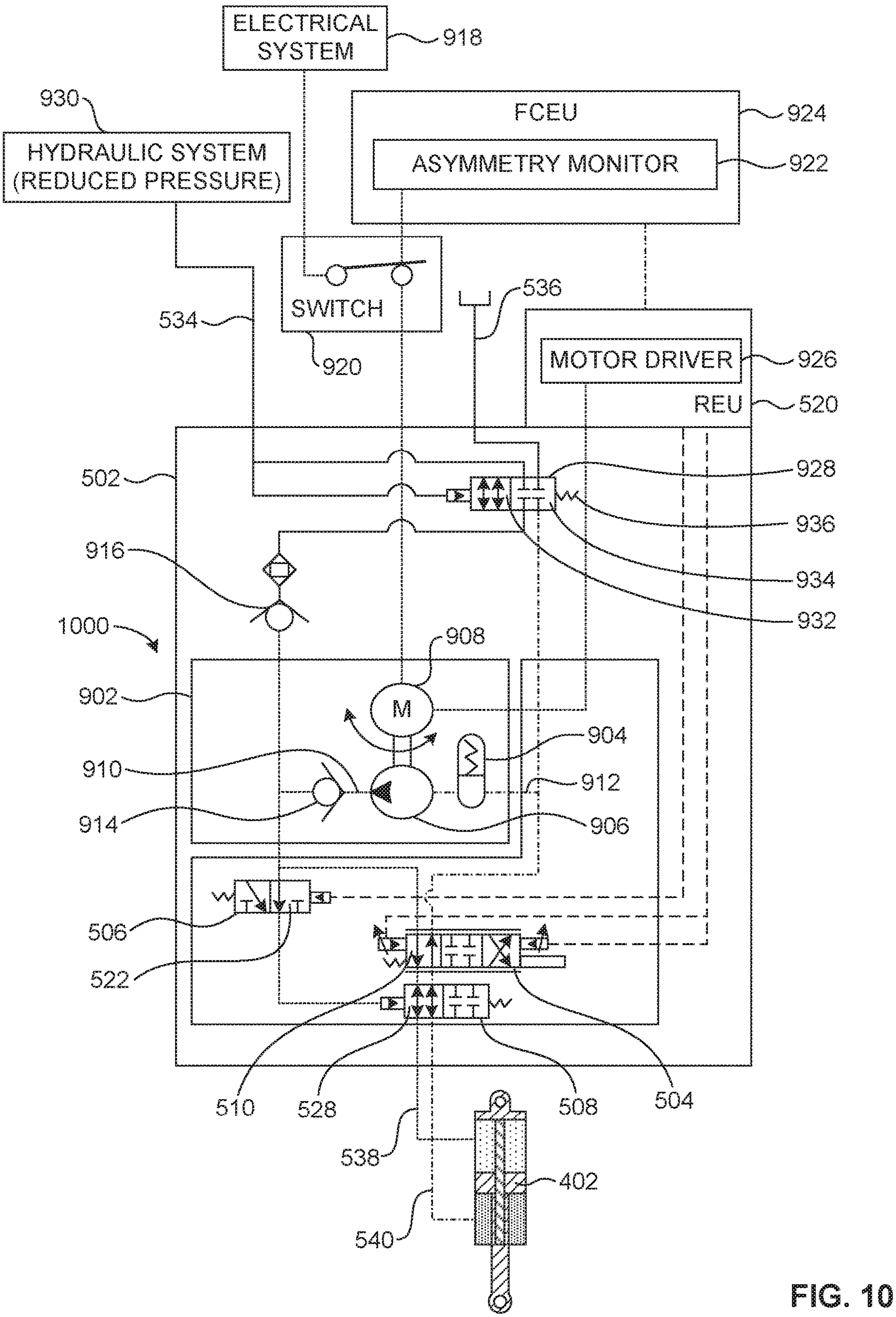
FIG. 10 is a schematic of the example LPU of the example HM1 hydraulic module of FIGS. 5-9 in an example second operational state.

FIG. 9 is a schematic of the example HM1 hydraulic module 502 of FIGS. 5-8 including an example LPU 902 in an example first operational state 900. FIG. 10 is a schematic of the example HM1 hydraulic module 502 of FIGS. 5-9 including the example LPU 902 in an example second operational state 1000. The LPU 902 of FIGS. 9 and 10 is located upstream from the EHSV 504 and the SOV 506 of the HM1 hydraulic module 502 of FIGS. 5-10. In the illustrated examples of FIGS. 9 and 10, the LPU 902 includes an example compensator 904, an example hydraulic pump 906, an example electrical motor 908, an example auxiliary supply line 910, an example auxiliary return line 912, and an example first check valve 914.

In the illustrated example of FIGS. 9 and 10, the compensator 904 stores and/or contains a volume of pressurized hydraulic fluid. In some examples, the volume of pressurized hydraulic fluid stored and/or contained within the compensator 904 is sufficient to move and/or actuate a piston of an actuator (e.g., the piston 410 of the actuator 402 of FIG. 2) from a retracted position to a retracted position, or vice-versa, when supplied to a fluid volume of the actuator (e.g., the first fluid volume 418 or the second fluid volume 420 of the actuator 402 of FIG. 4). The hydraulic pump 906 is in fluid communication with the compensator 904 and is operatively coupled to the electrical motor 908. The hydraulic pump 906 is also in fluid communication with the auxiliary supply line 910 and the auxiliary return line 912.

The hydraulic pump 906 is driven and/or powered by the electrical motor 908. When the electrical motor 908 and/or, more generally, the LPU 902 is powered on (e.g., the second operational state 1000 of FIG. 10, as further described below), the electrical motor 908 drives the hydraulic pump 906 to pump pressurized hydraulic fluid from the compensator 904 into the auxiliary supply line 910.

In the illustrated examples of FIGS. 9 and 10, the auxiliary supply line 910 passes through the first check valve 914. A portion of the auxiliary supply line 910 located downstream from the first check valve 914 is in fluid communication with a portion of the supply line 534 located downstream from an example second check valve 916. Pressurized hydraulic fluid that has passed through the first check valve 914 from the hydraulic pump 906 via the auxiliary supply line 910 is blocked by the first check valve 914 from returning to the hydraulic pump 906 via the auxiliary supply line 910, and is also blocked by the second check valve 916 from passing into a portion of the supply line 534 located upstream from the second check valve 916. Pressurized hydraulic fluid that has passed through the second check valve 916 from a portion of the supply line 534 located upstream from the second check valve 916 is blocked by the second check valve 916 from returning to the upstream portion of the supply line 534, and is also blocked by the first check valve 914 from passing through the auxiliary supply line 910 to the hydraulic pump 906.

The electrical motor 908 of FIGS. 9 and 10 may be powered by an example electrical system 918 of an aircraft. The electrical system 918 is independent of the hydraulic systems of the aircraft, and accordingly remains operable even when or more of the hydraulic system(s) of the aircraft fail(s). Electrical current and/or power from the electrical system 918 selectively passes through an example switch 920. The switch 920 is actuatable between an open position (as shown in FIG. 9) and a closed position (as shown in FIG. 10). The position of the switch 920 is controlled via an example asymmetry monitor 922 located within an example FCEU 924 of the aircraft. In the illustrated example of FIGS. 9 and 10, the asymmetry monitor 922 detects wing flap asymmetry by comparing flap position data obtained from flap position sensors (e.g., the flap position sensors 358, 360, 362, 364, 366, 368, 370, 372 of FIG. 3) of the wing flaps with flap position data commanded by the FCEU 924. When the asymmetry monitor 922 detects an asymmetry exceeding a threshold (e.g., a predetermined threshold), the FCEU 924 actuates the switch 920 to connect the electrical system 918 of the aircraft to the electrical motor 908 of the LPU 902. The FCEU 924 of FIGS. 9 and 10 is also operatively coupled to (e.g., in electrical communication with) an example motor driver 926 located within the REU 520 of FIGS. 9 and 10. The motor driver 926 is operatively coupled to the electrical motor 908 of FIGS. 9 and 10 and controls the speed at which the electrical motor 908 drives the hydraulic pump 906.

In addition to the LPU 902 described above, the HM1 hydraulic module 502 of FIGS. 9 and 10 also includes an example shuttle valve 928. In the illustrated example of FIGS. 9 and 10, the shuttle valve 928 is located upstream from the LPU 902 and the second check valve 916, and downstream from an example hydraulic system 930 of the aircraft. The shuttle valve 928 is a two-position valve having flow ports that are movable and/or actuatable between an example first flow port position 932 (e.g., a normal flow position) and an example second flow port position 934 (e.g., a blocked flow position). The shuttle valve 928 includes and/or is coupled to an example fourth bias spring 936. The fourth bias spring 936 biases the shuttle valve 928 into and/or toward the second flow port position 934 of the shuttle valve 928.

In the illustrated example of FIGS. 9 and 10, the shuttle valve 928 is operatively coupled to (e.g., in fluid communication with) the hydraulic system 930 of the aircraft. The hydraulic system 930 selectively positions the shuttle valve 928 in one of the first or second flow port positions 932, 934 of the shuttle valve 928. For example, the hydraulic system 930 may supply pressurized hydraulic fluid to the shuttle valve 928 to move the shuttle valve 928 from the second flow port position 934 into the first flow port position 932 over the bias generated by the fourth bias spring 936. If the hydraulic system 930 fails, pressurized hydraulic fluid is no longer supplied to the shuttle valve 928 via the hydraulic system 930, and the fourth bias spring 936 accordingly biases the shuttle valve 928 back into the second flow port position 934 of the shuttle valve 928. When the shuttle valve 928 is positioned in the second flow port position 934, hydraulic fluid returning from the EHSV 504 is blocked from passing through the shuttle valve 928 to the return line 536, and is instead forced to pass into the compensator 904 via the auxiliary return line 912.

FIG. 9 illustrates the LPU 902 of the HM1 hydraulic module 502 of FIGS. 5-10 in the first operational state 900. As shown in FIG. 9, the shuttle valve 928 is positioned in the first flow port position 932, the EHSV 504 is positioned in the first control port position 510, the SOV 506 is positioned in the first pilot port position 522, and the MSV 508 is positioned in the first flow port position 528. The shuttle valve 928 is hydraulically actuated into the first flow port position 932 via a pilot pressure received at the shuttle valve 928 from the hydraulic system 930. The EHSV 504 is energized and/or electrically commanded into the first control port position 510 via the REU 520. The SOV 506 is energized and/or electrically commanded into the first pilot port position 522 via the REU 520. The MSV 508 is hydraulically actuated into the first flow port position 528 via a pilot pressure received at the MSV 508 from the SOV 506.

The first operational state 900 of the LPU 902 of FIG. 9 is a state in which the electrical motor 908 and/or, more generally, the LPU 902 is powered off. For example, as shown in FIG. 9, the switch 920 is in an open position. The electrical system 918 is accordingly disconnected from the electrical motor 908 of the LPU 902. As a result of being disconnected from the electrical system 918, the electrical motor 908 is unable to power the hydraulic pump 906 of the LPU 902. The hydraulic pump 906 is therefore unable to pump pressurized hydraulic fluid from the compensator 904 into the auxiliary supply line 910.

In the illustrated example of FIG. 9, pressurized hydraulic fluid from the supply line 534 passes through the shuttle valve 928, through the second check valve 916, through the EHSV 504, through the MSV 508, through the first fluid line 538, and into a first fluid volume of an actuator via a first port of the actuator (e.g., the first fluid volume 418 of the actuator 402 via the first port 422 of FIG. 4). A piston of the actuator (e.g., the piston 410 of the actuator 402 of FIG. 4) moves away from a retracted position and toward an extended position in response to an increase in the first fluid volume. Movement of the piston away from the retracted position and toward the extended position decreases a second fluid volume of the actuator (e.g., the second fluid volume 420 of the actuator 402 of FIG. 4). As the second fluid volume decreases, pressurized hydraulic fluid contained within the second fluid volume passes from the second fluid volume of the actuator via a second port (e.g., the second port 424 of FIG. 4) through the second fluid line 540, through the MSV 508, through the EHSV 504, through the shuttle valve 928, and into the return line 536.

FIG. 10 illustrates the LPU 902 of the HM1 hydraulic module 502 of FIGS. 5-10 in the second operational state 1000. As shown in FIG. 10, the shuttle valve 928 is positioned in the second flow port position 934, the EHSV 504 is positioned in the first control port position 510, the SOV 506 is positioned in the first pilot port position 522, and the MSV 508 is positioned in the first flow port position 528. The shuttle valve 928 is biased into the second flow port position 934 via the fourth bias spring 936 as a result of a loss of pressure from the hydraulic system 930. The EHSV 504 is energized and/or electrically commanded into the first control port position 510 via the REU 520. The SOV 506 is energized and/or electrically commanded into the first pilot port position 522 via the REU 520. The MSV 508 is hydraulically actuated into the first flow port position 528 via a pilot pressure received at the MSV 508 from the SOV 506.

The second operational state 1000 of the LPU 902 of FIG. 9 is a state in which the electrical motor 908 and/or, more generally, the LPU 902 is powered on. For example, as shown in FIG. 10, the switch 920 is in a closed position. The electrical system 918 is accordingly connected to the electrical motor 908 of the LPU 902. As a result of being connected to the electrical system 918, the electrical motor 908 powers and/or drives the hydraulic pump 906 of the LPU 902. In response to being powered and/or driven by the electrical motor 908, the hydraulic pump 906 pumps pressurized hydraulic fluid from the compensator 904 into the auxiliary supply line 910.

In the illustrated example of FIG. 10, pressurized hydraulic fluid from the auxiliary supply line 910 passes through the first check valve 914, through the EHSV 504, through the MSV 508, through the first fluid line 538, and into a first fluid volume of an actuator via a first port of the actuator (e.g., the first fluid volume 418 of the actuator 402 via the first port 422 of FIG. 4). A piston of the actuator (e.g., the piston 410 of the actuator 402 of FIG. 4) moves away from a retracted position and toward an extended position in response to an increase in the first fluid volume. Movement of the piston away from the retracted position and toward the extended position decreases a second fluid volume of the actuator (e.g., the second fluid volume 420 of the actuator 402 of FIG. 4). As the second fluid volume decreases, pressurized hydraulic fluid contained within the second fluid volume passes from the second fluid volume of the actuator via a second port (e.g., the second port 424 of FIG. 4) through the second fluid line 540, through the MSV 508, through the EHSV 504, through the auxiliary return line 912, and into the compensator 904.

In some examples, only a single HM1 hydraulic module may be required per each wing flap (e.g., the first inboard flap 112, the first outboard flap 114, the second inboard flap 118, the second outboard flap 120) to effectively move and/or actuate the wing flap to a desired and/or predetermined position in the event of a partial or complete loss of the hydraulic system that otherwise controls the position of the wing flap. In such examples, a first one of the hydraulic modules associated with the wing flap may be implemented as an HM1 hydraulic module, and additional ones (e.g., a second one, a third one, etc.) of the hydraulic modules associated with the wing flap may be implemented as an HM2 hydraulic module. As described below in connection with FIGS. 11-14, the HM2 hydraulic module may have a construction that is simplified relative to that of the HM1 hydraulic module. For example, the HM2 hydraulic module may lack an LPU.

In some examples, a first actuator located at an outboard position of a wing flap may be operatively coupled to an HM1 hydraulic module, and a second actuator located at an inboard position of the wing flap may be operatively coupled to an HM2 hydraulic module. For example, in connection with the distributed trailing edge wing flap system 300 of FIG. 3 described above, the first and second hydraulic modules 318, 320 are associated with the first inboard flap 112, the third and fourth hydraulic modules 322, 324 are associated with the first outboard flap 114, the fifth and sixth hydraulic modules 326, 328 are associated with the second inboard flap 118, and the seventh and eighth hydraulic modules 330, 332 are associated with the second outboard flap 120. In such an example, the first, third, fifth and seventh hydraulic modules 318, 322, 326, 330 may respectively be implemented as HM1 hydraulic modules as described above in connection with FIGS. 5-10, and the second, fourth, sixth and eighth hydraulic modules 320, 324, 328, 332 may respectively be implemented as HM2 hydraulic modules as described below in connection with FIGS. 11-14. Respective ones of the first, third, fifth and seventh hydraulic modules 318, 322, 326, 330 are operatively coupled to corresponding respective ones of the first, third, fifth and seventh actuators 302, 306, 310, 314, each of which is located at a respective outboard position of a corresponding one of the first inboard flap 112, the first outboard flap 114, the second inboard flap 118, and the second outboard flap 120, as shown in FIG. 3. Respective ones of the second, fourth, sixth and eighth hydraulic modules 320, 324, 328, 332 are operatively coupled to corresponding respective ones of the second, fourth, sixth and eighth actuators 304, 308, 312, 316, each of which is located at a respective inboard position of a corresponding one of the first inboard flap 112, the first outboard flap 114, the second inboard flap 118, and the second outboard flap 120, as shown in FIG. 3.

Figure 11:
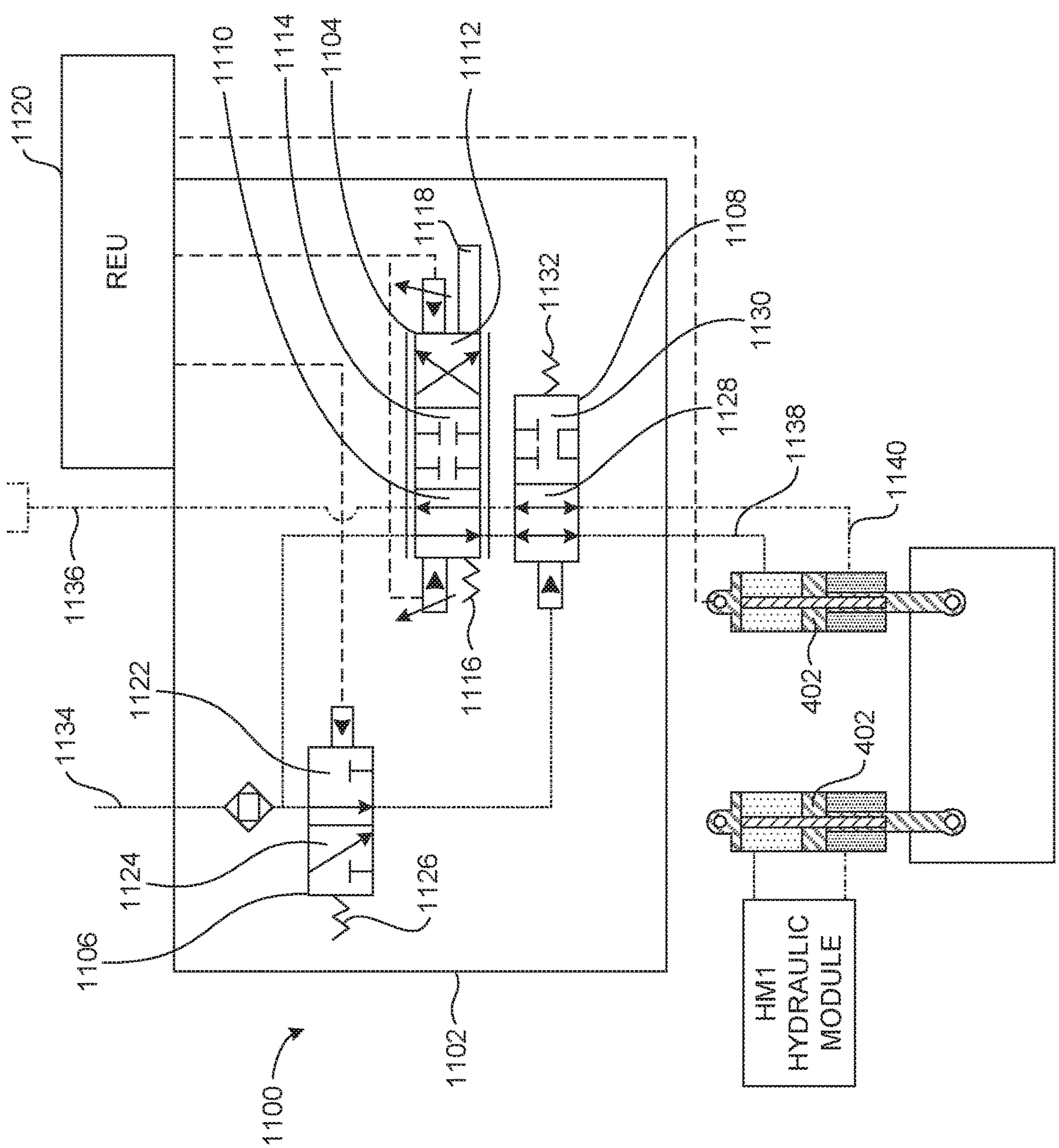
FIG. 11 is a schematic of an example HM2 hydraulic module in an example first operational state of a first mode.
Figure 12:
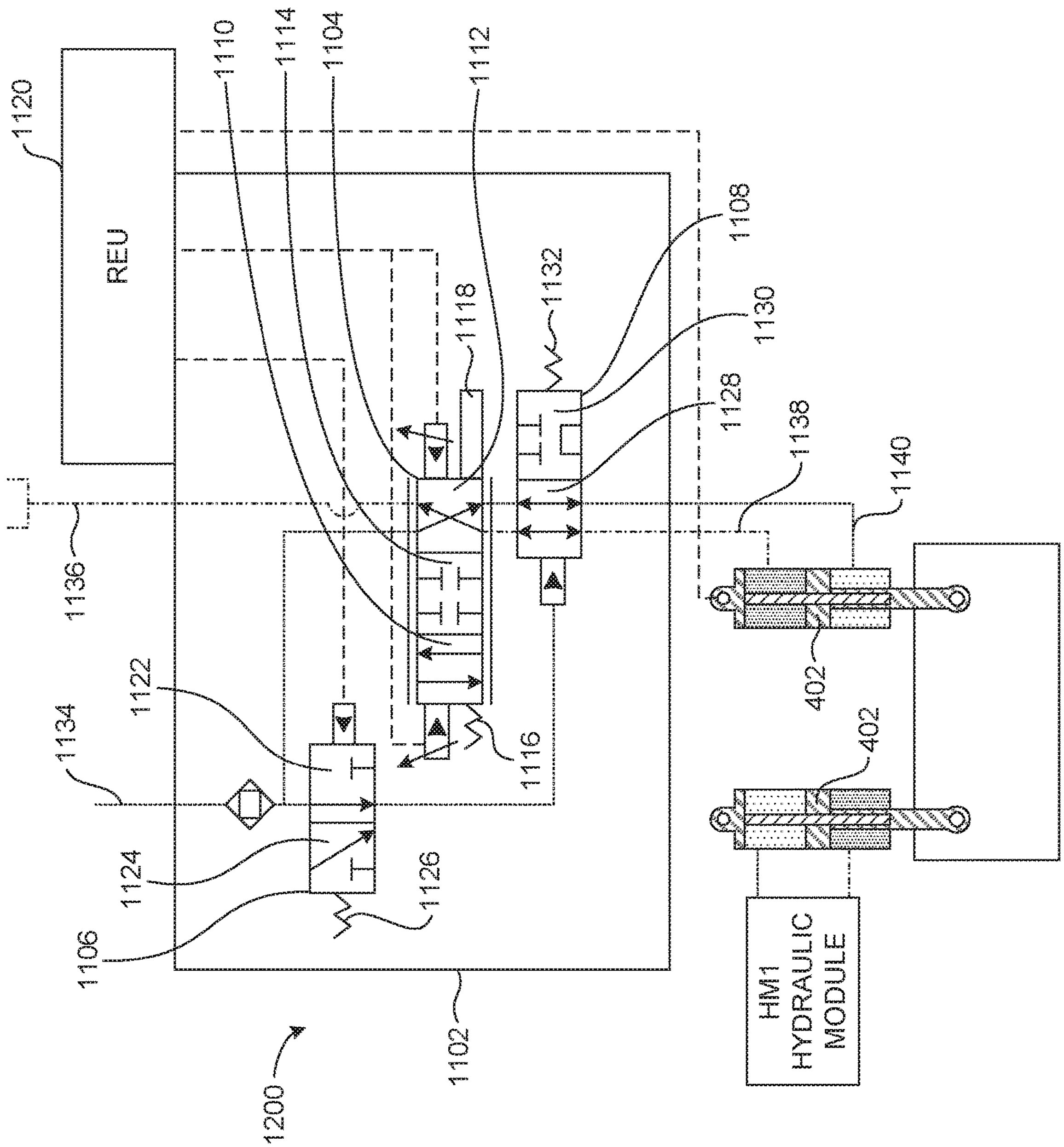
FIG. 12 is a schematic of the example HM2 hydraulic module of FIG. 11 in an example second operational state of the first mode.
Figure 13:
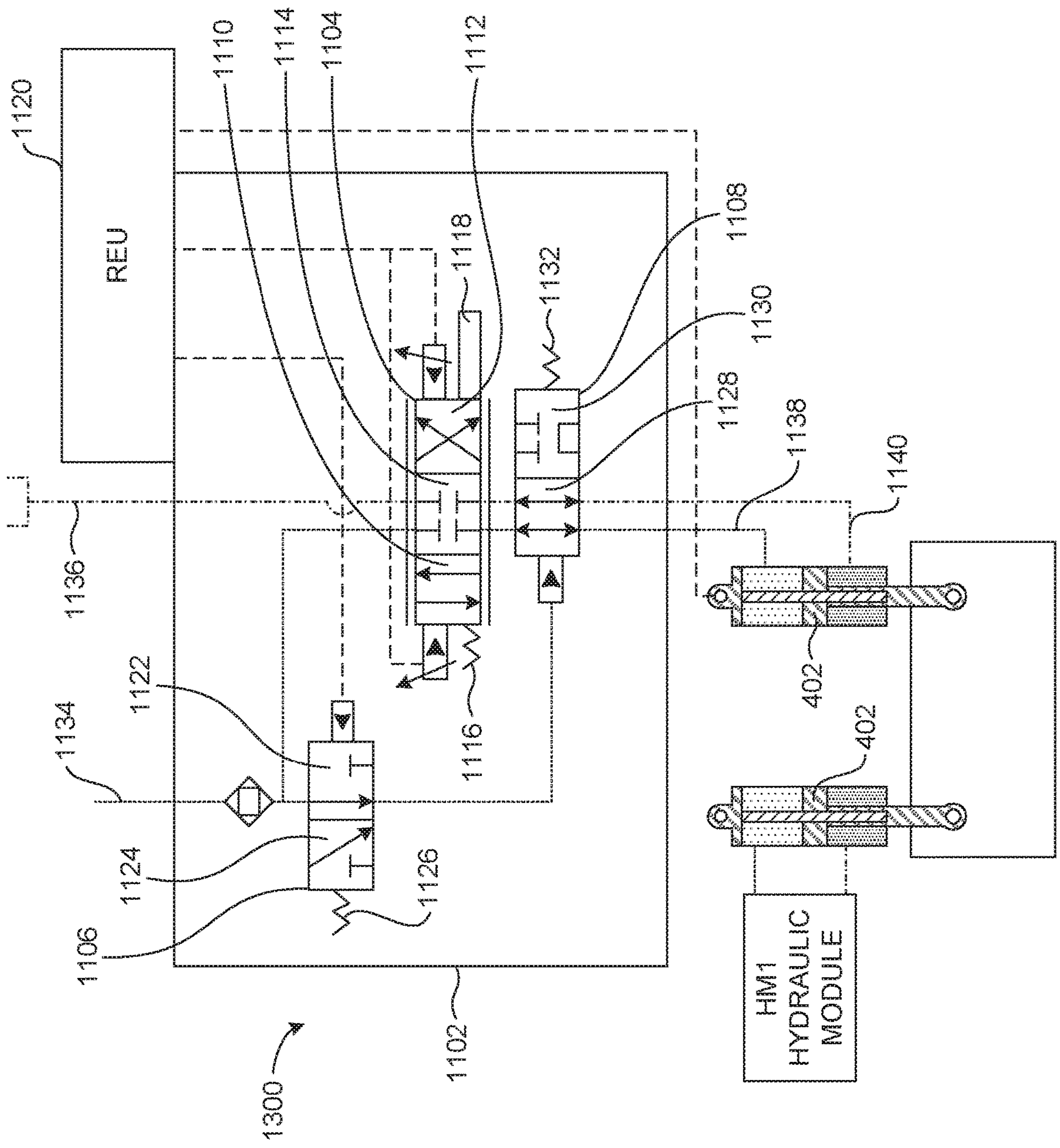
FIG. 13 is a schematic of the example HM2 hydraulic module of FIGS. 11 and 12 in an example third operational state of the first mode.
Figure 14:
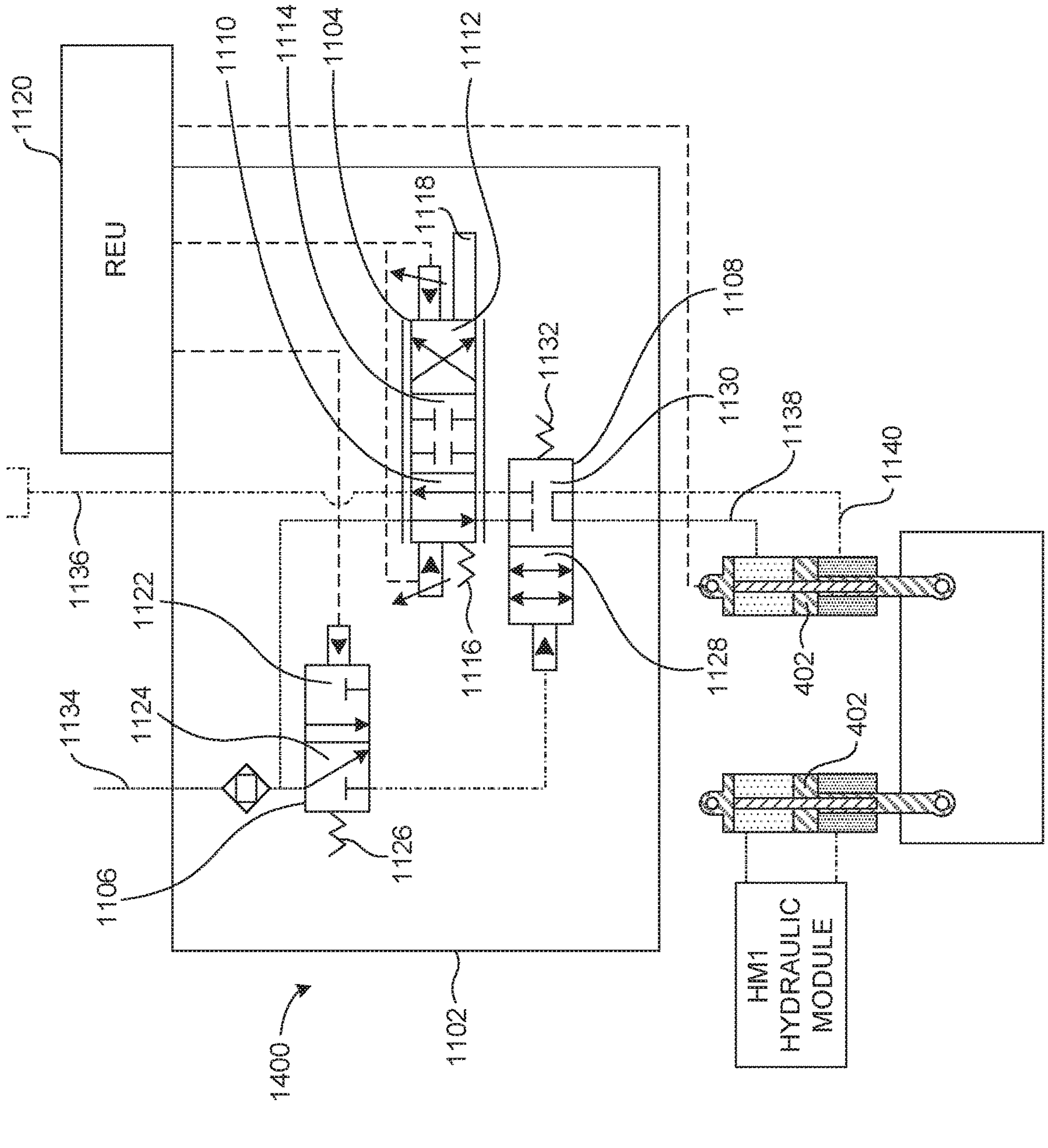
FIG. 14 is a schematic of the example HM2 hydraulic module of FIGS. 11-13 in an example operational state of a second mode.

FIG. 11 is a schematic of an example HM2 hydraulic module 1102 in an example first operational state 1100 of a first mode. FIG. 12 is a schematic of the example HM2 hydraulic module 1102 of FIG. 11 in an example second operational states 1200 of the first mode. FIG. 13 is a schematic of the example HM2 hydraulic module 1102 of FIGS. 11 and 12 in an example third operational state 1300 of the first mode. FIG. 14 is a schematic of the example HM2 hydraulic module 1102 of FIGS. 11-13 in an example operational state 1400 of a second mode. The first mode of FIGS. 11-13 corresponds to a normal mode of operation of the HM2 hydraulic module 1102 and/or, more generally, the distributed trailing edge wing flap system 300 of FIG. 3, in which the first hydraulic system 334 and/or the second hydraulic system 338 is/are operating according to normal and/or intended conditions. The second mode of FIG. 12 corresponds to a failure mode of operation of the HM2 hydraulic module 1102 and/or, more generally, the distributed trailing edge wing flap system 300 of FIG. 3, in which the first hydraulic system 334 and/or the second hydraulic system 338 is/are not operating according to normal and/or intended conditions (e.g., due to a partial or complete loss of pressure associated with the first hydraulic system 334 and/or the second hydraulic system 338).

In the illustrated examples of FIGS. 11-14, the HM2 hydraulic module 1102 includes an example EHSV 1104, an example SOV 1106, and an example MSV 1108. The EHSV 1104 of FIGS. 11-14 is a four-way flow-control valve which produces flow as a function of input current. The EHSV

1104 has three control ports that are movable and/or actuatable between an example first control port position 1110 (e.g., a flap deployment flow position), an example second control port position 1112 (e.g., a flap retraction flow position), and an example third control port position 1114 (e.g., a null region). The EHSV 1104 includes and/or is coupled to an example first bias spring 1116 and an example LVDT 1118. The first bias spring 1116 biases the EHSV 1104 into and/or toward the first control port position 1110 of the EHSV 1104. The LVDT 1118 senses, measures and/or detects a position of the EHSV 1104. In the illustrated example of FIGS. 11-14, the EHSV 1104 is operatively coupled to (e.g., in electrical communication with) an example REU 1120. The REU 1120 selectively positions the EHSV 1104 in one of the first, second, or third control port positions 1110, 1112, 1114 of the EHSV 1104. For example, the REU 1120 may energize the EHSV 1104 to move from the first control port position 1110 into the second control port position 1112 over the bias generated by the first bias spring 1116. In some examples, the REU 1120 transmits a control signal to the EHSV 1104 to control the position of the EHSV 1104. The REU 1120 also receives an electrical signal from an LVDT of actuator (e.g., the LVDT 414 of the actuator 402) associated with the REU 1120 and the HM2 hydraulic module 1102.

The SOV 1106 of FIGS. 11-14 is a two-position valve having pilot ports that are movable and/or actuatable between an example first pilot port position 1122 (e.g., a normal pilot flow position) and an example second pilot port position 1124 (e.g., a diverted pilot flow position). The SOV 1106 includes and/or is coupled to an example second bias spring 1126. The second bias spring 1126 biases the SOV 1106 into and/or toward the second pilot port position 1124 of the SOV 1106. In the illustrated example of FIGS. 11-14, the SOV 1106 is operatively coupled to (e.g., in electrical communication with) the REU 1120. The REU 1120 selectively positions the SOV 1106 in one of the first or second pilot port positions 1122, 1124 of the SOV 1106. For example, the REU 1120 may energize and/or electrically command the SOV 1106 to move from the second pilot port position 1124 into the first pilot port position 1122 over the bias generated by the second bias spring 1126. In some examples, the REU 1120 may de-energize the SOV 1106 in response to detecting and/or determining that a difference between an electrical signal from the LVDT 1118 of the EHSV 1104 and a calculated position of the EHSV 1104 exceeds a threshold (e.g., a predetermined threshold), as may occur in the case of a run-away and/or improperly functioning actuator.

The MSV 1108 is a two-position valve having flow ports that are movable and/or actuatable between an example first flow port position 1128 (e.g., a normal flow position) and an example second flow port position 1130 (e.g., a bypass flow position). The MSV 1108 includes and/or is coupled to an example third bias spring 1132. The third bias spring 1132 biases the MSV 1108 into and/or toward the second flow port position 1130 of the MSV 1108. In the illustrated example of FIGS. 11-14, the MSV 1108 is operatively coupled to (e.g., in fluid communication with) the SOV 1106 of FIGS. 11-14. The SOV 1106 selectively positions the MSV 1108 in one of the first or second flow port positions 1128, 1130 of the MSV 1108. For example, the SOV 1106 may supply pressurized hydraulic fluid to the MSV 1108 to move the MSV 1108 from the second flow port position 1130 into the first flow port position 1128 over the bias generated by the third bias spring 1132.

The HM2 hydraulic module 1102 of FIGS. 11-14 includes and/or is in fluid communication with an example supply line 1134 and an example return line 1136. In some examples, the supply line 1134 and the return line 1136 are associated with and/or in fluid communication with a hydraulic system of an aircraft (e.g., the first hydraulic system 334 or the second hydraulic system 338 of FIG. 3). In the illustrated examples of FIGS. 11-14, the supply line 1134 is in fluid communication with the EHSV 1104 and the SOV 1106. The return line 1136 is in fluid communication with the EHSV 1104. The HM2 hydraulic module 1102 of FIGS. 11-14 also includes and/or is in fluid communication with an example first fluid line 1138 and an example second fluid line 1140. In the illustrated examples of FIGS. 11-14, the first fluid line 1138 is in fluid communication with the MSV 1108 and a first port and/or a first fluid volume of an actuator (e.g., the first port 422 and/or the first fluid volume 418 of the actuator 402 of FIG. 4). The second fluid line 1140 is in fluid communication with the MSV 1108 and a second port and/or a second fluid volume of the actuator (e.g., the second port 424 and/or the second fluid volume 420 of the actuator 402 of FIG. 4).

As further described below, the EHSV 1104, the SOV 1106, and/or the MSV 1108 of the HM2 hydraulic module 1102 may be moved and/or actuated to selectively place the supply line 1134 in fluid communication with the first fluid line 1138 or the second fluid line 1140 to selectively provide pressurized hydraulic fluid to a first port or a second port of an actuator (e.g., the first port 422 or the second port 424 of the actuator 402 of FIG. 4). The EHSV 1104, the SOV 1106, and/or the MSV 1108 of the HM2 hydraulic module 1102 may also be moved and/or actuated to selectively place the return line 1136 in fluid communication with the first fluid line 1138 or the second fluid line 1140 to selectively receive pressurized hydraulic fluid from the first port or the second port of the actuator (e.g., the first port 422 or the second port 424 of the actuator 402 of FIG. 4).

FIG. 11 illustrates the HM2 hydraulic module 1102 of FIGS. 11-14 in the first operational state 1100 of the first and/or normal mode. As shown in FIG. 11, the EHSV 1104 is positioned in the first control port position 1110, the SOV 1106 is positioned in the first pilot port position 1122, and the MSV 1108 is positioned in the first flow port position 1128. The EHSV 1104 is energized and/or electrically commanded into the first control port position 1110 via the REU 1120. The SOV 1106 is energized and/or electrically commanded into the first pilot port position 1122 via the REU 1120. The MSV 1108 is hydraulically actuated into the first flow port position 1128 via a pilot pressure received at the MSV 1108 from the SOV 1106.

In the illustrated example of FIG. 11, pressurized hydraulic fluid from the supply line 1134 passes through the EHSV 1104, through the MSV 1108, through the first fluid line 1138, and into a first fluid volume of an actuator via a first port of the actuator (e.g., the first fluid volume 418 of the actuator 402 via the first port 422 of FIG. 4). A piston of the actuator (e.g., the piston 410 of the actuator 402 of FIG. 4) moves away from a retracted position and toward an extended position in response to an increase in the first fluid volume. Movement of the piston away from the retracted position and toward the extended position decreases a second fluid volume of the actuator (e.g., the second fluid volume 420 of the actuator 402 of FIG. 4). As the second fluid volume decreases, pressurized hydraulic fluid contained within the second fluid volume passes from the second fluid volume of the actuator via a second port (e.g., the second port 424 of FIG. 4) through the second fluid line 1140, through the MSV 1108, through the EHSV 1104, and into the return line 1136.

FIG. 12 illustrates the HM2 hydraulic module 1102 of FIGS. 11-14 in the second operational state 1200 of the first and/or normal mode. As shown in FIG. 12, the EHSV 1104 is positioned in the second control port position 1112, the SOV 1106 is positioned in the first pilot port position 1122, and the MSV 1108 is positioned in the first flow port position 1128. The EHSV 1104 is energized and/or electrically commanded into the second control port position 1112 via the REU 1120. The SOV 1106 is energized and/or electrically commanded into the first pilot port position 1122 via the REU 1120. The MSV 1108 is hydraulically actuated into the first flow port position 1128 via a pilot pressure received at the MSV 1108 from the SOV 1106.

In the illustrated example of FIG. 12, pressurized hydraulic fluid from the supply line 1134 passes through the EHSV 1104, through the MSV 1108, through the second fluid line 1140, and into a second fluid volume of an actuator via a second port of the actuator (e.g., the second fluid volume 420 of the actuator 402 via the second port 424 of FIG. 4). A piston of the actuator (e.g., the piston 410 of the actuator 402 of FIG. 4) moves away from an extended position and toward a retracted position in response to an increase in the second fluid volume. Movement of the piston away from the extended position and toward the retracted position decreases a first fluid volume of the actuator (e.g., the first fluid volume 418 of the actuator 402 of FIG. 4). As the first fluid volume decreases, pressurized hydraulic fluid contained within the first fluid volume passes from the first fluid volume of the actuator via a first port (e.g., the first port 422 of FIG. 4) through the first fluid line 1138, through the MSV 1108, through the EHSV 1104, and into the return line 1136.

FIG. 13 illustrates the HM2 hydraulic module 1102 of FIGS. 11-14 in the third operational state 1300 of the first and/or normal mode. As shown in FIG. 13, the EHSV 1104 is positioned in the third control port position 1114, the SOV 1106 is positioned in the first pilot port position 1122, and the MSV 1108 is positioned in the first flow port position 1128. The EHSV 1104 is energized and/or electrically commanded into the third control port position 1114 via the REU 1120. The SOV 1106 is energized and/or electrically commanded into the first pilot port position 1122 via the REU 1120. The MSV 1108 is hydraulically actuated into the first flow port position 1128 via a pilot pressure received at the MSV 1108 from the SOV 1106.

In the illustrated example of FIG. 13, the EHSV 1104 is positioned in the third control port position 1114 via the REU 1120. When positioned as such, the EHSV 1104 supplies zero control flow at zero load pressure drop to the MSV 1108. The EHSV 1104 will move from the third control port position 1114 to either the first control port position 1110 or the second control port position 1112 in response to an aerodynamic load applied to a wing flap associated with the HM2 hydraulic module 1102, and/or in response to the system commanded flap position (e.g., from the REU 1120 and/or an FCEU).

FIG. 14 illustrates the HM2 hydraulic module 1102 of FIGS. 11-14 in the operational state 1400 of the second and/or failure mode. The operational state 1400 may occur, for example, in connection with a system power-off condition (e.g., aircraft on ground and parked) or in connection with a failure which may be hydraulic (e.g., a failure of a hydraulic system of the aircraft) or electrical (e.g., a failure of an REU of the aircraft). As shown in FIG. 14, the EHSV 1104 is positioned in the first control port position 1110, the SOV 1106 is positioned in the second pilot port position 1124, and the MSV 1108 is positioned in the second flow port position 1130. The EHSV 1104 is de-energized via the REU 1120, thereby causing the first bias spring 1116 to move the EHSV 1104 into the first control port position 1110. The SOV 1106 is de-energized via the REU 1120, thereby causing the second bias spring 1126 to move the SOV 1106 into the second pilot port position 1124. A pilot pressure provided from the SOV 1106 to the MSV 1108 is diverted and/or lost in response to the SOV 1106 being positioned in the second pilot port position 1124. The diversion and/or loss of the pilot pressure causes the third bias spring 1132 to move the MSV 1108 into the second flow port position 1130.

In the illustrated example of FIG. 14, the MSV 1108 blocks the pressurized hydraulic fluid of the supply line 1134 from passing into the first fluid line 1138. The MSV 1108 also blocks the pressurized hydraulic fluid from passing into the return line 1136 from the second fluid line 1140. Pressurized hydraulic fluid contained within a first fluid volume of an actuator (the first fluid volume 418 of the actuator 402 of FIG. 4) freely passes from the first fluid volume through the first fluid line 1138, through the MSV 1108, through the second fluid line 1140, and into a second fluid volume of the actuator (e.g., the second fluid volume 420 of the actuator 402 of FIG. 4). Pressurized hydraulic fluid contained within the second fluid volume of the actuator also freely passes from the second fluid volume through the second fluid line 1140, through the MSV 1108, through the first fluid line 1138, and into the first fluid volume of the actuator. The unrestricted exchange and/or bypass of pressurized hydraulic fluid between the first fluid volume and the second fluid volume of the actuator enables a piston of the actuator (e.g., the piston 410 of the actuator 402 of FIG. 4) to be freely movable. The position of the piston and/or the position of a wing flap to which the piston is coupled is/are accordingly freely movable when the HM2 hydraulic module 1102 is in the operational state 1400 of the second and/or failure mode of FIG. 14.

From the foregoing, it will be appreciated that the disclosed distributed trailing edge wing flap systems advantageously include at least one actuator (e.g., one actuator per wing flap) that may be hydraulically driven and/or powered by a hydraulic system of an aircraft, and may independently be hydraulically driven and/or powered by a LPU selectively connected to an electrical system of the aircraft. When connected to the electrical system of the aircraft, the LPU advantageously supplies pressurized hydraulic fluid to the actuator independent of any pressurized hydraulic fluid that may be supplied to the actuator via the hydraulic system of the aircraft. The LPU may accordingly restore and/or maintain the ability of the aircraft to change and/or control a position of a wing flap with which the LPU is associated (e.g., restore and/or maintain the ability to actuate a wing flap to the last commanded position of the wing flap).

In some disclosed examples, each wing flap of a distributed trailing edge wing flap system includes at least one actuator that may be hydraulically driven and/or powered by a hydraulic system of an aircraft, and may independently be hydraulically driven and/or powered by a LPU selectively connected to an electrical system of the aircraft. In such examples, the LPUs advantageously restore and/or maintain the ability of the aircraft to change and/or control the respective positions of the respective wing flaps with which corresponding respective ones of the LPUs are associated (e.g., restore and/or maintain the ability to actuate respective ones of the wing flaps to corresponding respective last commanded positions of the wing flaps). In such examples, the distributed trailing edge wing flap system advantageously implements respective ones of the LPUs to prevent and/or mediate the development of asymmetries among the respective positions of respective ones of the wing flaps.

In some examples, a wing flap system for an aircraft is disclosed. In some disclosed examples, the wing flap system comprises a flap and an actuator. In some disclosed examples, the flap is movable between a deployed position and a retracted position relative to a fixed trailing edge of a wing of the aircraft. In some disclosed examples, the actuator is to move the flap relative to the fixed trailing edge. In some disclosed examples, the actuator is hydraulically drivable via first pressurized hydraulic fluid to be supplied by a hydraulic system of the aircraft. In some disclosed examples, the actuator is also hydraulically drivable via second pressurized hydraulic fluid to be supplied by a local power unit. In some disclosed examples, the local power unit is selectively connectable to an electrical system of the aircraft. In some disclosed examples, the electrical system is to power the local power unit to supply the second pressurized hydraulic fluid.

In some disclosed examples, the actuator is hydraulically drivable via the second pressurized hydraulic fluid independently of being hydraulically drivable via the first pressurized hydraulic fluid.

In some disclosed examples, the local power unit includes a compensator, a hydraulic pump in fluid communication with the compensator, and an electrical motor operatively coupled to the hydraulic pump. In some disclosed examples, the second pressurized hydraulic fluid is to include a volume of hydraulic fluid contained within the compensator. In some disclosed examples, the electrical motor is to drive the hydraulic pump to supply the second pressurized hydraulic fluid to the actuator in response to the electrical motor being connected to the electrical system.

In some disclosed examples, the wing flap system further comprises a switch operatively positioned between the electrical motor and the electrical system. In some disclosed examples, the switch is actuatable between an open position and a closed position. In some disclosed examples, the electrical motor is connected to the electrical system when the switch is in the closed position. In some disclosed examples, the switch is controlled via a flight control electronics unit of the aircraft. In some disclosed examples, the flap is a first flap of the aircraft. In some disclosed examples, the flight control electronics unit is to actuate the switch from the open position to the closed position in response to detecting an asymmetry between the first flap and a second flap of the aircraft that exceeds an asymmetry threshold.

In some disclosed examples, the wing flap system further comprises a hydraulic module, a remote electronics unit, and a flight control electronics unit. In some disclosed examples, the hydraulic module is located at and in fluid communication with the actuator. In some disclosed examples, the hydraulic module includes the local power unit. In some disclosed examples, the hydraulic module is also in fluid communication with the hydraulic system of the aircraft. In some disclosed examples, the remote electronics unit is located at and in electrical communication with the hydraulic module. In some disclosed examples, the remote electronics unit is to control the hydraulic module. In some disclosed examples, the flight control electronics unit is located remotely from the hydraulic module and the remote electronics unit. In some disclosed examples, the flight control electronics unit is to control the remote electronics unit.

In some disclosed examples, the actuator includes an actuator position feedback sensor. In some disclosed examples, the remote electronics unit is to receive actuator position feedback data sensed by the actuator position feedback sensor. In some disclosed examples, the flap includes a flap position sensor. In some disclosed examples, the flight control electronics unit is to receive flap position data sensed by the flap position sensor.

In some disclosed examples, the actuator is a first actuator. In some disclosed examples, the wing flap system further comprises a second actuator to move the flap relative to the fixed trailing edge. In some disclosed examples, the second actuator is hydraulically drivable via the first pressurized hydraulic fluid. In some disclosed examples, the second actuator is freely movable when the first actuator is receiving the second pressurized hydraulic fluid supplied via the local power unit.

In some examples, a wing flap system for an aircraft is disclosed. In some disclosed examples, the wing flap system comprises first, second, third and fourth flaps movable between respective deployed positions and respective retracted positions. In some disclosed examples, the first and second flaps are movable relative to a first fixed trailing edge of a first wing of the aircraft. In some disclosed examples, the third and fourth flaps are movable relative to a second fixed trailing edge of a second wing of the aircraft. In some disclosed examples, the wing flap system further comprises first, second, third, fourth, fifth, sixth, seventh and eighth actuators. In some disclosed examples, the first and second actuators are to move the first flap relative to the first fixed trailing edge. In some disclosed examples, the third and fourth actuators are to move the second flap relative to the first fixed trailing edge. In some disclosed examples, the fifth and sixth actuators are to move the third flap relative to the second fixed trailing edge. In some disclosed examples, the seventh and eighth actuators are to move the fourth flap relative to the second fixed trailing edge. In some disclosed examples, respective ones of the first, second, fifth and sixth actuators are hydraulically drivable via first pressurized hydraulic fluid to be supplied by a first hydraulic system of the aircraft. In some disclosed examples, respective ones of the third, fourth, seventh and eighth actuators are hydraulically drivable via second pressurized hydraulic fluid to be supplied by a second hydraulic system of the aircraft. In some disclosed examples, the wing flap system further comprises first, second, third and fourth local power units. In some disclosed examples, the first actuator is independently hydraulically drivable via third pressurized hydraulic fluid to be supplied by the first local power unit. In some disclosed examples, the third actuator is independently hydraulically drivable via fourth pressurized hydraulic fluid to be supplied by the second local power unit. In some disclosed examples, the fifth actuator is independently hydraulically drivable via fifth pressurized hydraulic fluid to be supplied by the third local power unit. In some disclosed examples, the seventh actuator is independently hydraulically drivable via sixth pressurized hydraulic fluid to be supplied by the fourth local power unit.

In some disclosed examples of the wing flap system, the aircraft includes a fly-by-wire flight control system and a power architecture having two independent hydraulic systems and two independent electrical systems.

In some disclosed examples, the first and third local power units are selectively connectable to a first electrical system of the aircraft. In some disclosed examples, the second and fourth local power units are selectively connectable to a second electrical system of the aircraft. In some disclosed examples, the first electrical system is to power the first and third local power units to respectively supply the third and fifth pressurized hydraulic fluids. In some disclosed examples, the second electrical system is to power the second and fourth local power units to respectively supply the fourth and sixth pressurized hydraulic fluids.

In some disclosed examples, the first local power unit includes a compensator, a hydraulic pump in fluid communication with the compensator, and an electrical motor operatively coupled to the hydraulic pump. In some disclosed examples, the third pressurized hydraulic fluid is to include a volume of hydraulic fluid contained within the compensator. In some disclosed examples, the electrical motor is to drive the hydraulic pump to supply the third pressurized hydraulic fluid to the first actuator in response to the electrical motor being connected to the first electrical system.

In some disclosed examples, the wing flap system further comprises first, second, third, fourth, fifth, sixth, seventh and eighth hydraulic modules respectively located at and in fluid communication with corresponding respective ones of the first, second, third, fourth, fifth, sixth, seventh and eighth actuators. In some disclosed examples, respective ones of the first, second, fifth and sixth hydraulic modules are also in fluid communication with the first hydraulic system of the aircraft. In some disclosed examples, respective ones of the third, fourth, seventh and eighth hydraulic modules are also in fluid communication with the second hydraulic system of the aircraft. In some disclosed examples, the first hydraulic module includes the first local power unit. In some disclosed examples, the third hydraulic module includes the second local power unit. In some disclosed examples, the fifth hydraulic module includes the third local power unit. In some disclosed examples, the seventh hydraulic module includes the fourth local power unit.

In some disclosed examples, the wing flap system further comprises first, second, third, fourth, fifth, sixth, seventh and eighth remote electronics units respectively located at and in electrical communication with corresponding respective ones of the first, second, third, fourth, fifth, sixth, seventh and eighth hydraulic modules. In some disclosed examples, respective ones of the first, second, third, fourth, fifth, sixth, seventh and eighth remote electronics units are to control corresponding respective ones of the first, second, third, fourth, fifth, sixth, seventh and eighth hydraulic modules.

In some disclosed examples, the wing flap system further comprises first and second flight control electronics units located remotely from the first, second, third, fourth, fifth, sixth, seventh and eighth hydraulic modules and remotely from the first, second, third, fourth, fifth, sixth, seventh and eighth remote electronics units. In some disclosed examples, the first flight control electronics unit is to control the respective ones of the first, second, fifth and sixth remote electronics units. In some disclosed examples, the second flight control electronics unit is to control respective ones of the third, fourth, seventh and eighth remote electronics units Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A wing flap system for an aircraft, the wing flap system comprising:

a flap movable between a deployed position and a retracted position relative to a fixed trailing edge of a wing of the aircraft; and an actuator to move the flap relative to the fixed trailing edge, the actuator being hydraulically drivable via first pressurized hydraulic fluid to be supplied from a hydraulic system of the aircraft to the actuator via a hydraulic module located at the actuator, the hydraulic module being in fluid communication with the hydraulic system and the actuator, the actuator also being hydraulically drivable independently from the first pressurized hydraulic fluid via second pressurized hydraulic fluid to be selectively supplied to the actuator from a compensator of a local power unit located within the hydraulic module, the local power unit including a motorized hydraulic pump selectively connectable to an electrical system of the aircraft, the electrical system to power the motorized hydraulic pump to supply the second pressurized hydraulic fluid to the actuator in response to a failure of the hydraulic system.

2. The wing flap system of claim 1, wherein the motorized hydraulic pump includes a hydraulic pump and an electrical motor, the hydraulic pump being in fluid communication with the compensator, the electrical motor being operatively coupled to the hydraulic pump, the second pressurized hydraulic fluid to include a volume of hydraulic fluid contained within the compensator.

3. The wing flap system of claim 2, wherein the electrical motor is to drive the hydraulic pump to supply the second pressurized hydraulic fluid to the actuator in response to the electrical motor being connected to the electrical system.

4. The wing flap system of claim 2, further comprising a switch operatively positioned between the electrical motor and the electrical system, the switch being actuatable between an open position and a closed position, the electrical motor being connected to the electrical system when the switch is in the closed position.

5. The wing flap system of claim 4, wherein the switch is controlled via a flight control electronics unit of the aircraft.

6. The wing flap system of claim 5, wherein the flap is a first flap of the aircraft, and wherein the flight control electronics unit is to actuate the switch from the open position to the closed position in response to detecting an asymmetry between the first flap and a second flap of the aircraft that exceeds an asymmetry threshold.

7. The wing flap system of claim 1, further comprising:

a remote electronics unit located at and in electrical communication with the hydraulic module, the remote electronics unit to control the hydraulic module; and a flight control electronics unit located remotely from the hydraulic module and the remote electronics unit, the flight control electronics unit to control the remote electronics unit.

8. The wing flap system of claim 7, wherein the actuator includes an actuator position feedback sensor, the remote electronics unit to receive actuator position feedback data sensed by the actuator position feedback sensor.

9. The wing flap system of claim 7, wherein the flap includes a flap position sensor, the flight control electronics unit to receive flap position data sensed by the flap position sensor.

10. The wing flap system of claim 1, wherein the actuator is a first actuator, the wing flap system further comprising a second actuator to move the flap relative to the fixed trailing edge, the second actuator being hydraulically drivable via the first pressurized hydraulic fluid.

11. The wing flap system of claim 10, wherein the second actuator is freely movable when the first actuator is receiving the second pressurized hydraulic fluid supplied via the local power unit.

12. A wing flap system for an aircraft, the wing flap system comprising:

first, second, third and fourth flaps movable between respective deployed positions and respective retracted positions, the first and second flaps being movable relative to a first fixed trailing edge of a first wing of the aircraft, the third and fourth flaps being movable relative to a second fixed trailing edge of a second wing of the aircraft;

first, second, third, fourth, fifth, sixth, seventh and eighth actuators, the first and second actuators to move the first flap relative to the first fixed trailing edge, the third and fourth actuators to move the second flap relative to the first fixed trailing edge, the fifth and sixth actuators to move the third flap relative to the second fixed trailing edge, the seventh and eighth actuators to move the fourth flap relative to the second fixed trailing edge, respective ones of the first, second, fifth and sixth actuators being hydraulically drivable via first pressurized hydraulic fluid to be supplied by a first hydraulic system of the aircraft, respective ones of the third, fourth, seventh and eighth actuators being hydraulically drivable via second pressurized hydraulic fluid to be supplied by a second hydraulic system of the aircraft; and first, second, third and fourth local power units respectively located at the first, third, fifth, and seventh actuators, the first actuator being hydraulically drivable independently from the first pressurized hydraulic fluid via third pressurized hydraulic fluid to be supplied to the first actuator from a compensator of the first local power unit in response to a failure of the first hydraulic system, the third actuator being hydraulically drivable independently from the second pressurized hydraulic fluid via fourth pressurized hydraulic fluid to be supplied to the third actuator from a compensator of the second local power unit in response to a failure of the second hydraulic system, the fifth actuator being hydraulically drivable independently from the first pressurized hydraulic fluid via fifth pressurized hydraulic fluid to be supplied to the fifth actuator from a compensator of the third local power unit in response to the failure of the first hydraulic system, the seventh actuator being hydraulically drivable independently from the second pressurized hydraulic fluid via sixth pressurized hydraulic fluid to be supplied to the seventh actuator from a compensator of the fourth local power unit in response to the failure of the second hydraulic system.

13. The wing flap system of claim 12, wherein the aircraft includes a fly-by-wire flight control system and a power architecture having two independent hydraulic systems and two independent electrical systems.

14. The wing flap system of claim 12, wherein the first and third local power units are selectively connectable to a first electrical system of the aircraft, and wherein the second and fourth local power units are selectively connectable to a second electrical system of the aircraft, the first electrical system to power the first and third local power units to respectively supply the third and fifth pressurized hydraulic fluids, the second electrical system to power the second and fourth local power units to respectively supply the fourth and sixth pressurized hydraulic fluids.

15. The wing flap system of claim 14, wherein the first local power unit further includes a hydraulic pump and an electrical motor, the hydraulic pump being in fluid communication with the compensator of the first local power unit, the electrical motor being operatively coupled to the hydraulic pump, the third pressurized hydraulic fluid to include a volume of hydraulic fluid contained within the compensator of the first local power unit.

16. The wing flap system of claim 15, wherein the electrical motor is to drive the hydraulic pump to supply the third pressurized hydraulic fluid to the first actuator in response to the electrical motor being connected to the first electrical system.

17. The wing flap system of claim 12, further comprising first, second, third, fourth, fifth, sixth, seventh and eighth hydraulic modules respectively located at and in fluid communication with corresponding respective ones of the first, second, third, fourth, fifth, sixth, seventh and eighth actuators, respective ones of the first, second, fifth and sixth hydraulic modules also being in fluid communication with the first hydraulic system of the aircraft, respective ones of the third, fourth, seventh and eighth hydraulic modules also being in fluid communication with the second hydraulic system of the aircraft, the first hydraulic module including the first local power unit, the third hydraulic module including the second local power unit, the fifth hydraulic module including the third local power unit, the seventh hydraulic module including the fourth local power unit.

18. The wing flap system of claim 17, further comprising first, second, third, fourth, fifth, sixth, seventh and eighth remote electronics units respectively located at and in electrical communication with corresponding respective ones of the first, second, third, fourth, fifth, sixth, seventh and eighth hydraulic modules, respective ones of the first, second, third, fourth, fifth, sixth, seventh and eighth remote electronics units to control corresponding respective ones of the first, second, third, fourth, fifth, sixth, seventh and eighth hydraulic modules.

19. The wing flap system of claim 18, further comprising first and second flight control electronics units located remotely from the first, second, third, fourth, fifth, sixth, seventh and eighth hydraulic modules and remotely from the first, second, third, fourth, fifth, sixth, seventh and eighth remote electronics units, the first flight control electronics unit to control the respective ones of the first, second, fifth and sixth remote electronics units, the second flight control electronics unit to control respective ones of the third, fourth, seventh and eighth remote electronics units.

20. A wing flap system for an aircraft, the wing flap system comprising:

a flap movable between a deployed position and a retracted position, the flap being movable relative to a fixed trailing edge of a wing of the aircraft;

first and second actuators to move the flap relative to the fixed trailing edge, the first and second actuators being commonly hydraulically drivable via first pressurized hydraulic fluid to be supplied by a hydraulic system of the aircraft; and a local power unit located at the first actuator, the first actuator being hydraulically drivable independently from the first pressurized hydraulic fluid via second pressurized hydraulic fluid to be supplied to the first actuator from a compensator of the local power unit in response to a failure of the hydraulic system.

* * * * *